US012655649B2

(12) United States Patent
Hansen et al.

(10) Patent No.: US 12,655,649 B2
(45) Date of Patent: Jun. 16, 2026

(54) STABILIZED WIND TURBINES, SYSTEMS FOR STABILIZING WIND TURBINES, AND METHODS FOR INSTALLING SAME

(71) Applicant: Vestas Wind Systems A/S, Aarhus (DK)

(72) Inventors: Jens-Jørgen Hansen, Højbjerg (DE); Torben Ladegaard Baun, Skødstrup (DK); Jesper Lykkegaard Neubauer, Hornslet (DK); Christian Skov, Videbæk (DK)

(73) Assignee: Vestas Wind Systems A/S, Aarhus N. (DK)

( * ) Notice: Subject to any disclaimer, the term of this patent is extended or adjusted under 35 U.S.C. 154(b) by 163 days.

(21) Appl. No.: 18/567,866

(22) PCT Filed: Jun. 24, 2022

(86) PCT No.: PCT/DK2022/050142
§ 371 (c)(1),
(2) Date: Dec. 7, 2023

(87) PCT Pub. No.: WO2023/274478
PCT Pub. Date: Jan. 5, 2023

(65) Prior Publication Data
US 2025/0122744 A1 Apr. 17, 2025

(30) Foreign Application Priority Data

Jun. 30, 2021 (DK) ............................ PA 2021 70337

(51) Int. Cl.
| *E04H 12/20* | (2006.01) |
| *F03D 13/10* | (2016.01) |
| *F03D 13/20* | (2016.01) |

(52) U.S. Cl.
CPC ........... *E04H 12/20* (2013.01); *F03D 13/112* (2023.08); *F03D 13/201* (2023.08); *F05B 2240/917* (2013.01)

(58) Field of Classification Search
CPC ....... Y02E 10/72; Y02E 10/728; F03D 13/20; F03D 13/10; E04H 12/085; E04H 12/20; E04H 12/342
See application file for complete search history.

(56) References Cited

U.S. PATENT DOCUMENTS

| 3,181,158 A | * | 4/1965 | Feldman | .................. | H01Q 1/34 |
| | | | | | 455/99 |
| 8,171,715 B2 | * | 5/2012 | Segura | ................... | F16G 15/06 |
| | | | | | 59/85 |

(Continued)

FOREIGN PATENT DOCUMENTS

| CN | 111608864 A | 9/2020 |
| CN | 111720269 A | 9/2020 |

(Continued)

OTHER PUBLICATIONS

Danish Patent and Trademark Office, first technical exam issued in corresponding DK Application No. PA 2021 70337, dated Jan. 26, 2022.

(Continued)

*Primary Examiner* — Brian E Glessner
*Assistant Examiner* — Daniel J Kenny
(74) *Attorney, Agent, or Firm* — Wood Herron & Evans LLP

(57) ABSTRACT

A wind turbine (10) supported by a plurality of cables (20). The wind turbine (10) includes a tower (12). An energy generating unit (14) is disposed on the tower (12) and is configured to produce electrical energy from wind (40). The tower (12) includes an upper section and a lower section. Each of the upper and lower sections includes an inwardly (Continued)

directed flange (82, 90) having a plurality of through-bores (84, 92, 96). An annular member (62, 120) has one or more ears (50, 204) that extend outwardly. Each ear (50, 204) is configured to be coupled to one of the plurality of cables (20). The annular member (62) includes a plurality of bores (68, 72, 104) that align with the through-bores (84, 92, 96) in the inwardly directed flanges (82, 90). The bores (68, 72) each includes a screw thread (100, 102). Threaded fasteners (94) are used to secure the annular member (62, 120) to the tower (12). A method of installing includes tensioning cables (20) after installing the interface module (18, 120) on the tower (12) and before installing the energy generating unit (14).

20 Claims, 16 Drawing Sheets

(56) References Cited

U.S. PATENT DOCUMENTS

| | | | | |
|---|---|---|---|---|
| 10,145,138 | B2 * | 12/2018 | Pedersen | F03D 13/40 |
| 10,598,154 | B2 * | 3/2020 | Pedersen | E04H 12/342 |

| | | | | |
|---|---|---|---|---|
| 10,676,952 | B2 * | 6/2020 | Fang | E04H 12/20 |
| 11,235,959 | B2 * | 2/2022 | Mayfield | E04H 12/345 |
| 11,274,658 | B2 * | 3/2022 | Lühn | F03D 13/20 |
| 11,971,012 | B2 * | 4/2024 | Saez Anthonisen | F03D 13/20 |
| 12,297,655 | B2 * | 5/2025 | Klaassen | E04H 12/085 |
| 2010/0024311 | A1 * | 2/2010 | Wambeke | E04H 12/085 |
| | | | | 29/889 |
| 2011/0131898 | A1 * | 6/2011 | Nies | F16B 5/025 |
| | | | | 52/173.1 |
| 2017/0292283 | A1 * | 10/2017 | Drewes | F03D 80/70 |
| 2019/0161991 | A1 * | 5/2019 | Mtauweg | E04H 12/085 |
| 2019/0234096 | A1 | 8/2019 | Fang et al. | |

FOREIGN PATENT DOCUMENTS

| | | | |
|---|---|---|---|
| CN | 111980866 | A | 11/2020 |
| DE | 102015000818 | B3 | 12/2015 |
| WO | 2014068592 | A1 | 5/2014 |
| WO | 2021056923 | A1 | 4/2021 |

OTHER PUBLICATIONS

International Searching Authority, International Search Report and Written Opinion issued in corresponding PCT Application No. PCT/DK2022/050142, dated Sep. 27, 2022.

* cited by examiner

STABILIZED WIND TURBINES, SYSTEMS FOR STABILIZING WIND TURBINES, AND METHODS FOR INSTALLING SAME

TECHNICAL FIELD

The invention relates generally to wind turbines, and more particularly to a system for stabilizing a wind turbine and to a method for installing the system.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower and an energy generating unit positioned atop of the tower. The energy generating unit typically includes a nacelle to house mechanical and electrical components, such as a generator, and a rotor operatively coupled to the components in the nacelle through a main shaft extending from the nacelle. The rotor, in turn, includes a central hub and a plurality of blades extending radially therefrom and configured to interact with the wind to cause rotation of the rotor. The rotor is supported on the main shaft, which is either directly or indirectly operatively coupled with the generator housed inside the nacelle. Consequently, as wind forces the blades to rotate, electrical energy is produced by the generator.

The tower elevates the energy generating unit above the earth and is typically a tubular steel structure. A base end of the tower is fixed to a foundation, and the energy generating unit is coupled to an opposing end of the tower. The tower must have a bearing capacity capable of supporting its own weight, the weight of the energy generating unit, and dynamic loads during operation of the wind turbine. Transportation and/or production restrictions limit the tower size and thus bearing capacity. Yet, increasing the bearing capacity of the tower is desirable to increase the electrical generating capacity of the wind turbine.

To increase the bearing capacity of the tower, the diameter of the tower may be increased. Increasing the diameter of the tower increases the bearing capacity by the power of two. That is, doubling the diameter of the tower quadruples the bearing capacity of the tower. Advantageously, tower stiffness also increases but by a power of three. So, increasing the diameter permits larger, more powerful energy generating units to be utilized. While increasing the diameter is effective, there is an upper limit to the diameter of the tower. As identified above, production and/or transportation restrictions limit increases in diameter and increases in height of the tower. Another dimension that may be modified is the shell thickness or wall thickness. While the shell thickness may be increased, it is generally an inefficient way of increasing the bearing capacity and the stiffness as compared to increasing the tower diameter. Bearing capacity and stiffness increase only linearly with the shell thickness. With transportation and/or production being a limiting factor for increasing bearing capacity, other solutions have been developed.

To address transportation and production limitations, some towers are composed of multiple tower sections coupled end-to-end at joints. A tower may be composed of two or more sections joined end-to-end. Even according to this solution, the diameter of each section is limited by transportation and/or production because of the overall dimensions of the sections or because of the weight of each tower section.

As an alternative or in addition to changing the dimensions of the tower, bearing capacity of a tower can be increased and the stresses in parts of the tower reduced by stabilizing the tower with cables or wires. The cables extend from anchors or foundations in the earth to points on the tower. With this so-called guyed tower or tethered tower, certain loads are carried by the cables and so are not carried by the tower. Each tower section may therefore be constructed with a relatively smaller diameter, which is more economical to produce and/or transport, while also obtaining a predetermined tower height.

One drawback to a tethered tower is that it takes up more land. Land consumption must be accounted for during planning and especially during erection and maintenance of the wind turbine. Also, proper tensioning and attachment of the cables are crucial for the wind tower to withstand the varying and potentially large wind forces.

The wind turbine industry is searching for solutions to installation and attachment of cables at minimal cost while stabilizing wind turbine towers during energy production.

SUMMARY

To these and other ends, stabilized wind turbines, systems for stabilizing wind turbines, and methods of installing a stabilization system for wind turbines are provided. A stabilized wind turbine is supported by a plurality of cables. The wind turbine includes a tower with at least two tower sections, a lower section and an upper section. The lower section includes an inwardly directed flange at its upper end having a plurality of first through-bores. The upper section includes an inwardly directed flange at its lower end having a plurality of second through-bores. An interface module is secured to the upper end of the lower section and includes an annular member from which one or more ears extend outwardly. Each ear is configured to be coupled to one of the plurality of cables. The annular member includes a plurality of first bores that align with the plurality of first through-bores in the inwardly directed flange of the lower section. Each of the plurality of first bores has a screw thread. The annular member includes a plurality of second bores that align with the plurality of second through-bores in the inwardly directed flange of the upper section. Each of the plurality of second bores having a screw thread. An energy generating unit is disposed on the tower and is configured to produce electrical energy from wind.

In one embodiment, the wind turbine further includes a plurality of threaded fasteners. Individual ones of the plurality of fasteners extend through individual ones of the plurality of first through-bores and engage the screw thread of each of the plurality of first bores to secure the interface module to the lower tower section.

In one embodiment, the annular member includes an outside surface, a top surface, a bottom surface, and an inner surface that includes a channel.

In one embodiment, the first bores are blind bores.

In one embodiment the annular member including a plurality of third bores. The third bores are through-bores that open in the channel. The inwardly directed flange having a second set of first through-bores. The third bores align with the second set of first through-bores in the inwardly directed flange. The channel is configured to receive a nut and the nut is threadable onto a bolt inserted through the third bore.

In one embodiment, the lower tower section includes a wall from which the inwardly directed flange extends. Each ear extends outwardly and downwardly from the annular member so that a neutral axis of the ear intersects a neutral axis of the annular member at a neutral axis of the wall. In one embodiment, each cable is coupled to a respective ear at a cardan-type joint. In one embodiment, each ear includes a pair of spaced-apart flanges.

In one embodiment, each cable is coupled to a respective ear at a joint, and the joint includes two rotational axes that are each oriented in a respective plane parallel to one another while being perpendicular to a vertical tower axis. In one embodiment, the two rotational axes are spaced apart by a flexible arm. The annular member further includes a stop, and the flexible arm includes a stop that is configured to contact the stop on the annular member to provide a limit to rotational movement of the flexible arm when the flexible arm rotates under the influence of gravity. In one embodiment, the annular member is a non-segmented, continuous ring.

In one embodiment, the annular member is a collection of separate segments that are configured to be assembled together. Each segment defines a circular arc and is coupled to other segments at a joint at each end of the circular arc. The annular member may consist of three segments. Each segment may be identical. Each segment includes at least two ears. Each joint may be a lap joint.

In one embodiment, each joint is formed by a partial thickness member on each of the segments. A joint interface between the partial thickness members is oriented in a plane perpendicular to a vertical tower axis.

According to another aspect, the wind turbine includes a tower with at least two tower sections, a lower section and an upper section. The lower section includes an inwardly directed flange at its upper end having a plurality of first through-bores. An interface module is secured to the upper end of the lower section and includes an annular member from which one or more ears extend outwardly and downwardly so that a neutral axis of the ear intersects a neutral axis of the annular member at a neutral axis of the wall. Each ear is configured to be coupled to one of the plurality of cables. The annular member includes a plurality of first bores that align with the plurality of first through-bores in the inwardly directed flange of the lower section. An energy generating unit is disposed on the tower and configured to produce electrical energy from wind.

According to another aspect, there is a method of installing a wind turbine that includes an energy generating unit and a tower. A plurality of cables is attached to the tower. The method includes installing the tower including installing at least one lower tower section. The upper most one of the at least one lower tower section has an inwardly directed flange at its upper end, the flange having a plurality of first through-bores at one end. The method further includes installing an interface module on the one end. The interface module includes an annular member. A plurality of ears extends outwardly from the annular member. Each ear is for receiving one of the plurality of cables. The annular member includes a plurality of first bores. Installing includes aligning the plurality of first bores with the plurality of first through-bores. The method further includes inserting a plurality of threaded fasteners through individual ones of the plurality of first through-bores and into individual ones of the plurality of first bores to secure the interface module to the at least one lower tower section. After securing the interface module, the method further includes tensioning each cable between one of the plurality of ears and an anchor. After tensioning, the method further includes installing the energy generating unit on the wind turbine tower.

In one embodiment, each of the plurality of first bores has a screw thread and inserting the plurality of threaded fasteners includes threading at least one threaded fastener to engage the screw thread of the first bore.

In one embodiment, prior to installing the energy generating unit, the method further includes installing an upper tower section on the interface module. In one embodiment, the upper tower section includes an inwardly directed flange at one end. The inwardly directed flange includes a plurality of second through-bores. The annular member includes a plurality of second bores. Each of the plurality of second bores has a screw thread. Installing the upper tower section includes aligning the second through-bores with the second bores and inserting a plurality of threaded fasteners through the second through-bores and into the second bores to engage the screw thread of the second bore. The fasteners secure the interface module to the upper tower section. In one embodiment, the plurality of first bores in the annular member are blind bores. Inserting the plurality of threaded fasteners in the upper most one of the at least one lower tower section includes inserting the threaded fasteners upwardly through the first through-bores and into the blind bores.

In one embodiment, tensioning includes tensioning each one of the plurality of cables to at least 70% of a predetermined tension. In one embodiment, tensioning includes tensioning each one of the plurality of cables to a tension in a range of 30% to 70% of a predetermined tension. In one embodiment, prior to installing the interface module, the method further includes attaching one or more of the plurality of cables to one or more of the plurality of ears. In one embodiment, during installing of the interface module, the method includes separating the attached cables to create an opening sized to allow the at least one tower section to pass through the opening. In one embodiment, installing the interface module includes elevating the interface module no more than one-half meter above the height of the flange.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
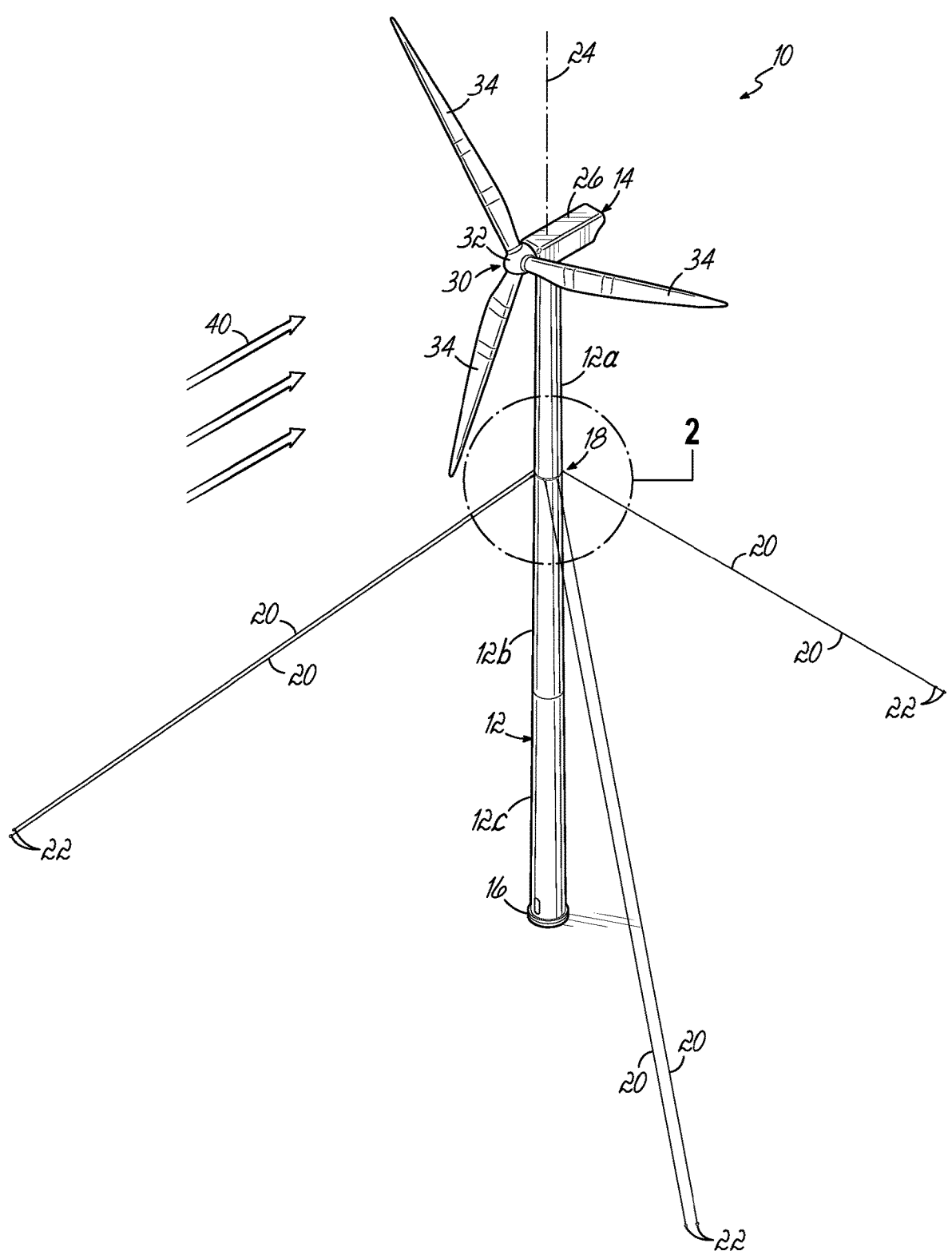
FIG. 1 is a perspective view of a wind turbine having a guyed tower according to one embodiment of the invention.

With reference to FIG. 1, a wind turbine 10 includes a tower 12 and an energy generating unit 14 disposed at the apex of the tower 12. The tower 12 may be coupled to a foundation 16 at a lower end thereof. The exemplary tower 12 shown is modular and includes three sections 12*a*, 12*b*, and 12*c*. As shown, by way of example only, an interface module 18 (described in detail below) is positioned between section 12*a* and section 12*b* and serves as a point of attachment for cables 20 to the tower 12. The cables 20 are secured to anchors 22 in the earth. The tower 12 is a so-called guyed tower. The interface module 18 in combination with cables 20 and anchors 22 are an effective stabilization system for the wind turbine 10, which may also be advantageously utilized during installation of the wind turbine 10 as is described below. The three sections 12*a*, 12*b*, 12*c*, and interface module 18 collectively define a generally vertical tower axis 24 about which the energy generating unit 14 may rotate via a yaw mechanism (not shown). The foundation 16 may be a relatively large mass (e.g., concrete, anchor cage, etc.) embedded in the ground and through which forces on the wind turbine 10 may be ultimately transferred. Although not shown, in an alternative embodiment, the foundation 16 may include an offshore platform or the like used in offshore wind turbine applications. The anchors 22 may be a portion of the foundation 16 or be separate anchor structures from the foundation 16. These anchors 22 may be in a symmetric circular array around the tower 12 or other pattern, such as one that enhances load carrying capacity in one direction. The guyed tower 12 supports the weight of the energy generating unit 14 and operates to elevate the energy generating unit 14 to a height above ground level or sea level at which faster moving air currents of lower turbulence are typically found.

In that regard, the energy generating unit 14 transforms the energy of the wind into electrical energy. The energy generating unit 14 typically includes a housing or nacelle 26, a rotor 30 having a central hub 32 and one or more blades 34 (e.g., three blades) mounted to the central hub 32 and extending radially therefrom, and a generator (not shown) for converting mechanical energy into electrical energy. The energy generating unit 14 may further include a drive train (not shown), including a gear arrangement, interconnecting the rotor 30 and the generator. The generator and a substantial portion of the drive train may be positioned inside of the nacelle 26 of the wind turbine 10. In addition to the generator, the nacelle 26 typically houses miscellaneous components required for converting wind energy into electrical energy and various components needed to operate, control, and optimize the performance of the wind turbine

10. The wind turbine blades 34 are configured to interact with the wind. As is shown in FIG. 1, wind 40 (shown as arrows) produces lift and causes the rotor 30 to spin or rotate generally within a plane defined by the wind turbine blades 34. The energy generating unit 14 generates power from the airflow 40 that passes through the swept area of the rotor 30. In addition to generating power, the airflow 40 produces dynamic loads on the wind turbine 10. The dynamic loads and the static loads from the dead weight of the energy generating unit 14 must be borne by the tower 12 as supported by the cables 20.

Figure 2:
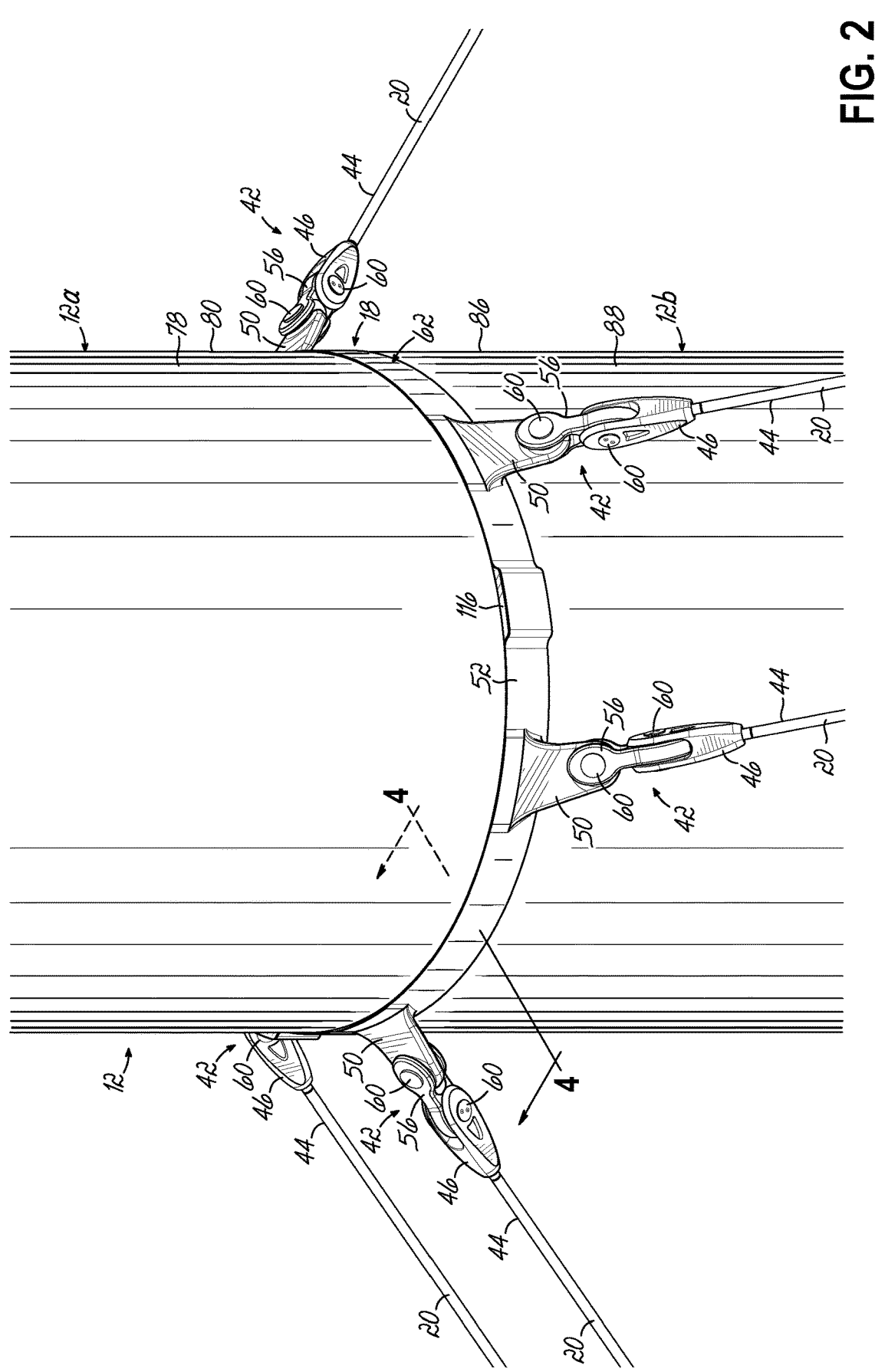
FIG. 2 is an enlarged perspective view of the encircled area 2 in FIG. 1.

To that end, with reference now to FIG. 2, the interface module 18 is secured between the tower section 12*a* and the tower section 12*b* and is coupled to the cables 20. Similar to any of the tower sections 12*a*, 12*b*, 12*c*, the interface module 18 shares in all the loads on the tower 12 during operation of the wind turbine 10. For instance, the interface module 18 carries both tensile and compressive forces. In addition to supporting the dead weight above it and tensile loads from bending of the tower (12), the interface module 18 distributes dynamic loads from movement of the tower 12 due to the wind 40 to the cables 20. The offloading of those loads from the tower 12 to the cables 20 is advantageous. As an example, the tower may be redesigned with the diameter of the tower being reduced as compared to a tower without cables. Other changes are also possible and may include increasing the height of the tower and/or placing a larger rotor/more powerful energy generating unit on the tower than would otherwise be permissible.

Although not shown, the cables 20 are taut or tensioned in their attachment between the interface module 18 and the anchors 22. Once anchored, the cables 20 permit shared loading of bending moments in the tower 12. From an attachment point of the cable 20 on the interface module 18 and downward, bending moments are significantly reduced. Although not shown in FIGS. 1 and 2, the interface module 18 may be inserted between any two sections of a tower. As examples, the interface module 18 may be positioned between any two sections of a modular tower (as shown) and/or between a tower and an energy generating unit 14 (as long as the cables 20 are arranged to avoid interference with the blades 34). Further, multiple interface modules 18 may be utilized at different locations. Embodiments of the invention are not limited to the location shown in the figures. Although six cables 20 are shown in FIGS. 1 and 2, embodiments of the invention are not limited to six cables. Specifically, embodiments of the invention specifically include more than 6 cables or less than 6 cables.

With continued reference to FIG. 2, cables 20 are coupled to the interface module 18 at joints 42 at one end portion 44 of each cable 20. Each cable 20 is coupled to the interface module 18 at an ear 50 that extends outwardly and downwardly from an outer surface 52 of the interface module 18. In the exemplary embodiment shown, the interface module 18 includes six ears 50. Each ear 50 includes a through-bore 54 (shown best in FIG. 3A) by which the joint 42 is made with the cable 20. To form the exemplary joint 42, an end portion 44 of each cable 20 is fitted with a socket 46. An eyelet 56 is secured between the ear 50 and the socket 46 via a pair of pins 60. The joints 42 shown in FIG. 2 are cardan-type joints with two axes of rotation. The axes are each defined by one of the pins 60 near each end of the eyelet 56. The two axes are offset from one another and oriented perpendicular to one another. However, the joints 42 are not limited to the style shown in FIG. 2. As an example, an alternative joint configuration is described below with respect to FIG. 9.

Figure 3A:
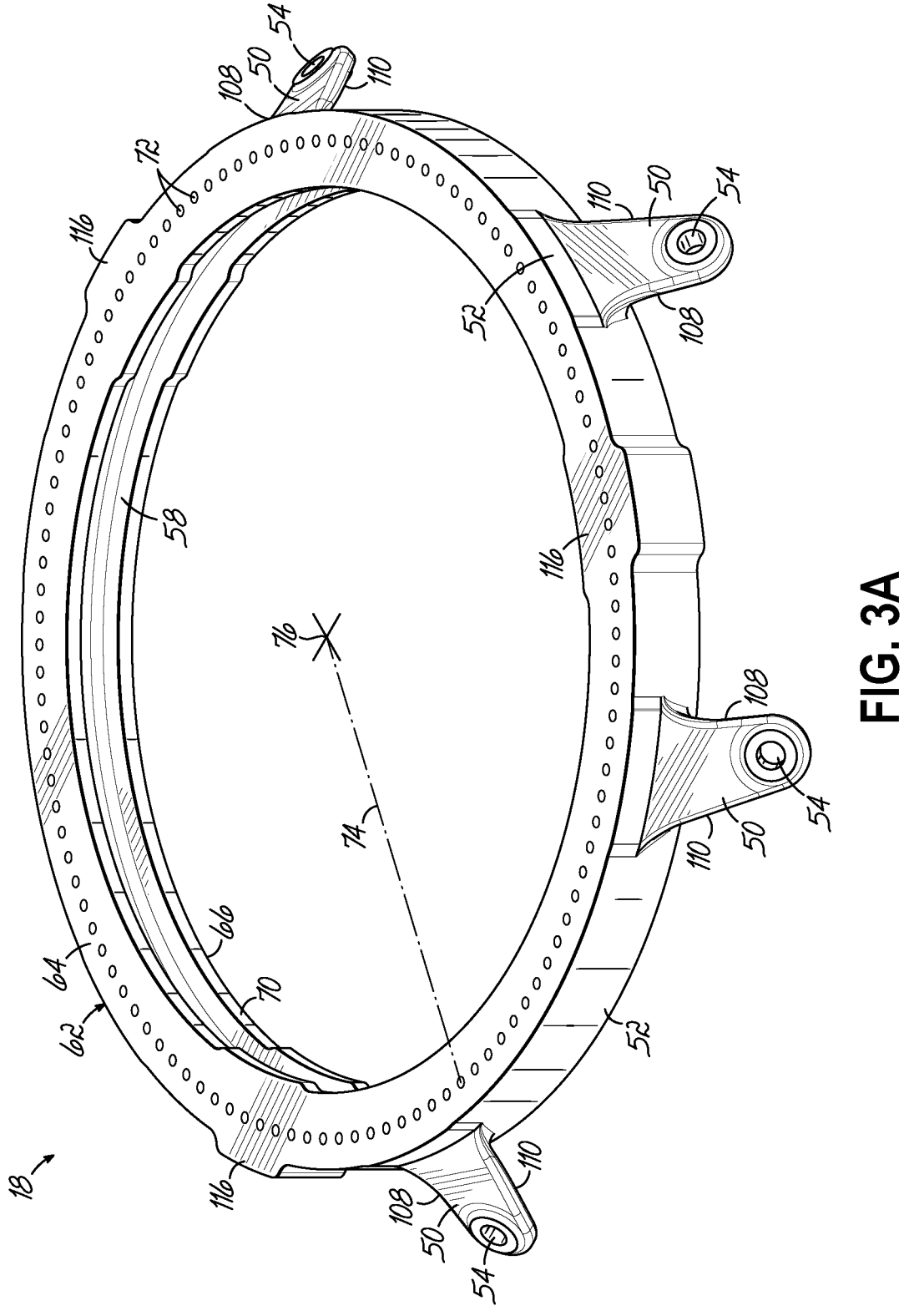
FIGS. 3A and 3B are a perspective view and a plan view, respectively, of an interface module shown in FIG. 2 according to one embodiment of the invention.
Figure 3B:
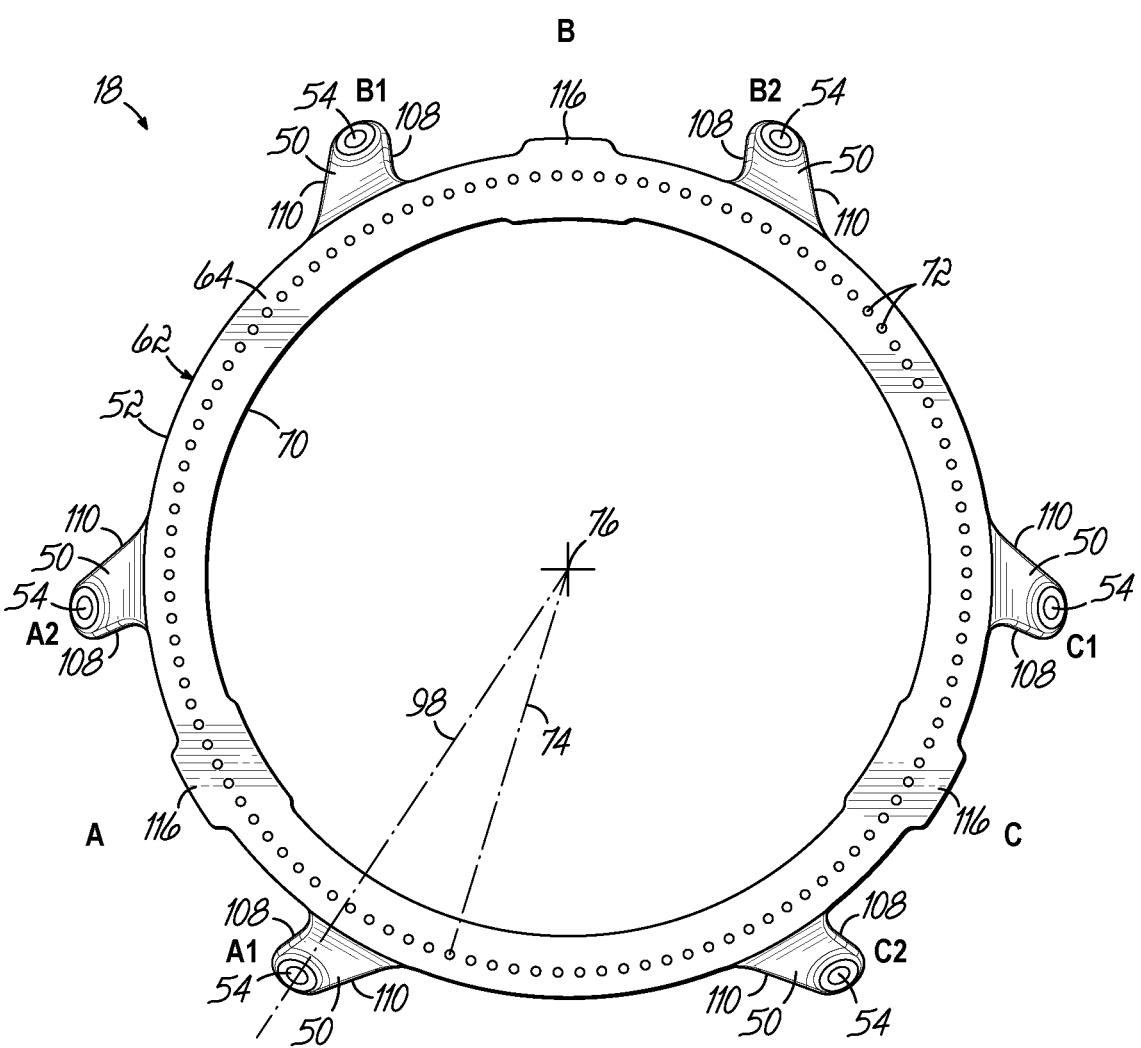

With reference to FIGS. 3A and 3B, the interface module 18 includes an annular member 62 that is a continuous (i.e., it is non-segmented) ring and defines the outer surface 52. As an alternative to the non-segmented annular member 62, a segmented interface module is described below with reference to FIGS. 7 and 8 in which the annular member 62 is a collection of smaller segments or arc portions of the ring that may be assembled together prior to installation. Each of the interface modules described herein may be formed by casting, machining, or the like. For example, the interface module 18 shown in FIG. 3A may be a monolithic metallic structure that is cast and then machined to dimension. By way of example, a height of the annular member 62 as measured from the top surface 64 to the bottom surface 66 may be up to 300 mm, such as from 200 mm to 300 mm with shorter heights being preferred. The height of the annular member 62 is not particularly limiting. With continued reference to FIGS. 3A, 3B, and 4, the annular member 62 further includes a top surface 64, a bottom surface 66, and an inside surface 70. The relative arrangement of surfaces 52, 64, 66, and 70 gives the annular member 62 a generally rectangular cross section. The inside surface 70 may include a channel 58 that visually divides the annular member 62 into upper and lower flanges separated by a web. The cross section having a U-shaped configuration. In that case, the thickness of the annular member 62 from the inside surface 70 at the channel 58 is less than the thicknesses from inside surface 70 to outer surface 52 proximate the top surface 64 or proximate the bottom surface 66 (i.e., not in the channel 58). In one embodiment, the channel 58 has a limited height dimension (labeled H in FIG. 6A) that prohibits fasteners/ tools from being inserted into the channel 58 to couple the interface module 18 to either the tower section 12*a* or tower section 12*b*. In other words, tools and fasteners don't fit in the channel 58. For example, a threaded nut won't fit in the channel 58. Embodiments of the invention, however, are not limited to the annular member 62 that includes the channel 58. In that regard, the channel 58 is shown in phantom line in FIG. 4 and so is optional. The inside surface 70 may have any number of configurations that extend from the top surface 64 to the bottom surface 66. By way of example only, the inside surface 70 may be a plane (as is illustrated in FIG. 4).

Figure 6A:
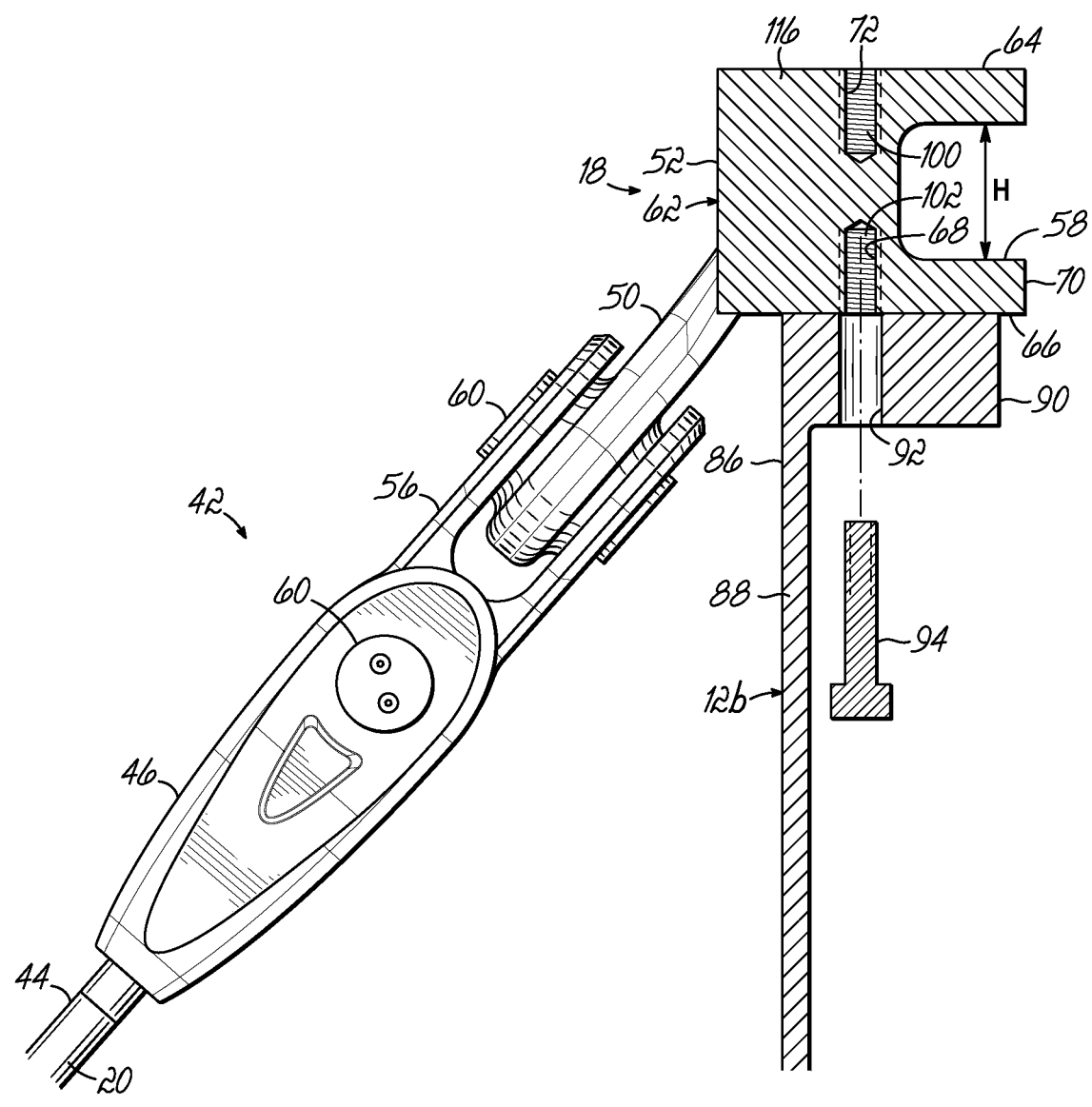
FIG. 6A is a cross-sectional view taken along section 6A-6A of FIG. 5.
Figure 6B:
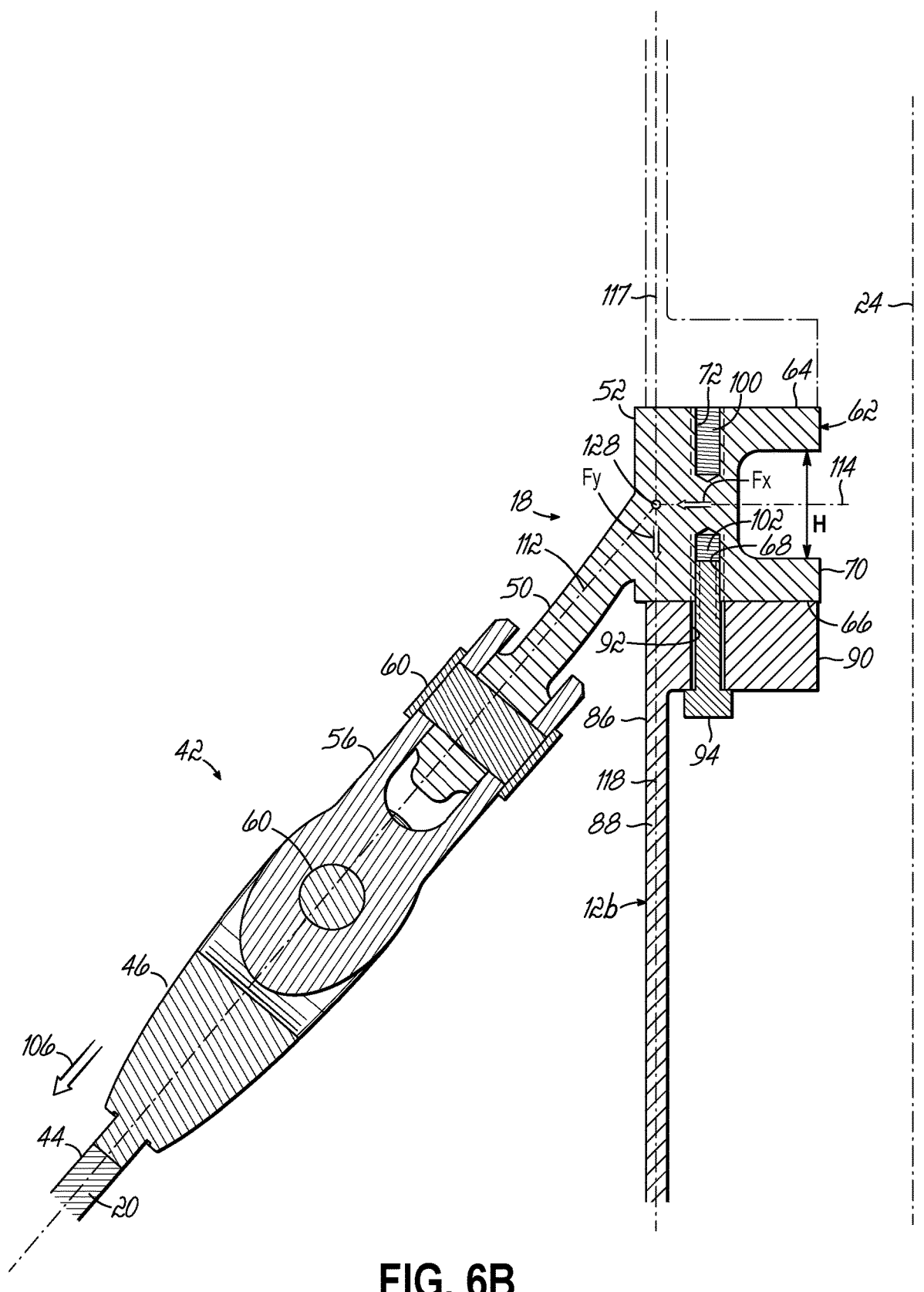
FIG. 6B is a cross-sectional view taken along section 6B-6B of FIG. 5.

As is shown in FIGS. 3A and 6B, in one embodiment, the ears 50 extend outwardly and downwardly from the outer surface 52. Each ear 50 extends outwardly from a midpoint of the outer surface 52. A portion of the outer surface 52 separates the ears 50 from the top surface 64 and the bottom surface 66. That is, in one embodiment, the ears 50 do not extend outwardly from the outer surface 52 flush with either of the top surface 64 or the bottom surface 66. The height of the annular member 62 is greater than the vertical thickness of the ears 50 at an area where the ear 50 merges into the annular member 62.

Referring to FIG. 3B, in one embodiment, the ears 50 do not extend radially outward from the outer surface 52. As an example, a radial plane 98 constructed through and parallel to the central axis 76 through the bore 54 in the ear 50 does not create a symmetrical bisection of the ear 50. Pairs of ears 50 extend in similar directions as the anchor 22 of the cables 20 connected to the ears 50 may be shared by each individual pair. For example, ear A1 and ear A2 visually form a pair of ears 50 and project generally in the same direction away from the interface module 18. Other pairs include B1 and B2 and C1 and C2, such that the interface module 18 includes six ears 50 in three ear pairs (i.e., A1, A2; B1, B2; and C1, C2). Further, due to their lack of symmetry about the radial plane 98, each ear 50 includes a short side 108 and a long side 110. For a pair of ears 50, the short sides 108 of each ear 50 of the pair face one another. The long sides 110 face away from one another. For instance, in FIG. 3B, the short side 108 of ear A1 faces the short side 108 of ear A2; the short side 108 of ear B1 faces the short side 108 of B2; and the short side 108 of ear C1 faces the short side 108 of ear C2. Also shown in FIG. 3B, the annular member 62 includes enlarged areas 116 in which the inside surface 70 and the outer surface 52 are spaced further apart relative to adjacent portions of the annular member 62 to increase the thickness of the annular member 62 in a localized area. The enlarged areas 116 may be positioned midway between pairs of ears. For example, enlarged area A is positioned midway between ears A1 and A2. Likewise, enlarged areas B and C are positioned midway between ears B1 and B2 and C1 and C2, respectively.

Figure 4:
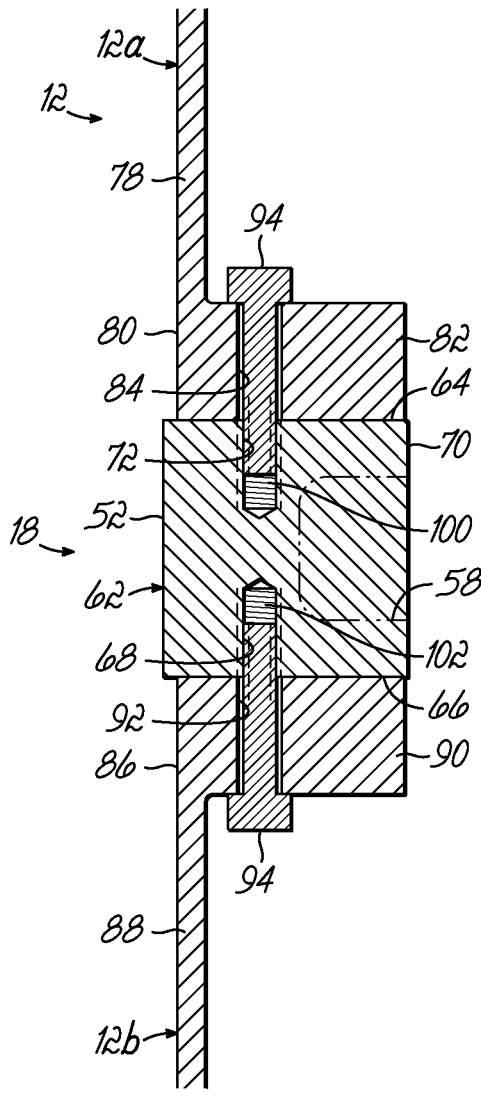
FIG. 4 is a cross-sectional view of the tower of FIG. 2 taken along section 4-4.

Also shown in FIGS. 3A, 3B, and 4, a plurality of second bores 72 open to the top surface 64 but may not extend through to the bottom surface 66. In other words, the second bores 72 may be blind bores and in one embodiment each second bore 72 includes a screw thread 100. Additionally, first bores 68 open to the bottom surface 66. Similar to the second bores 72, the first bores 68 may be blind bores and in one embodiment each first bore 68 includes a screw thread 102. The first and second bores 68, 72 extend only partway into the annular member 62 and terminate at a location spaced between the channel 58 and the outer surface 52. While in the exemplary embodiment, blind bores are shown and described, a single threaded through-bore may open to the top surface 64 and the bottom surface 66. As an additional alternative, the second bores 72 and/or the first bores 68 may open to the channel 58.

Referring to FIGS. 3B and 4, the first and second bores 68, 72 may be positioned equidistant from a central axis 76 (i.e., on the same radius 74) though embodiments are not limited to that configuration. The first bores 68 may be positioned on a radius that is larger or smaller than the radius 74. Furthermore, the first bores 68 and second bores 72 do not necessarily align on any particular radial cross section of the interface module 18. As is shown in FIG. 4, a tower section or other tower component (e.g., a yaw mechanism, not shown) may be coupled to the interface module 18 via the second bores 72 and the first bores 68 permit the interface module 18 to be coupled to a tower. As an example, FIGS. 2 and 4 illustrate the interface module 18 between the tower section 12*a* and the tower section 12*b*.

In the exemplary embodiment shown in FIGS. 2 and 4, the interface module 18 is secured to each of the tower section 12*a* and the tower section 12*b*. At end 80 (i.e., lower end) of the tower section 12*a*, a flange 82 extends inwardly from a tower wall 78 and includes a plurality of second through-bores 84. Similarly, at end 86 (i.e., upper end) of the tower section 12*b*, a flange 90 extends inwardly from a tower wall 88 and includes a plurality of first through-bores 92. The end 80 of the tower section 12*a* contacts the top surface 64 of the interface module 18, and the end 86 of the tower section 12*b* contacts the bottom surface 66 of the interface module 18. The second through-bores 84 through the flange 82 align with the second bores 72 in the annular member 62. A threaded bolt 94 or another type of screw fastener, extends through the flange 82 and engages the interface module 18 at the second bore 72. In the exemplary embodiment, the second bore 72 is threaded and the bolt 94 has a corresponding thread, as shown. And, at the flange 90, the first through-bores 92 align with the first bores 68. An additional bolt 94 or another type of threaded fastener, is inserted upwardly through the flange 90 to engage the interface module 18 at the first bore 68. In the exemplary embodiment, the first bore 68 is threaded and the bolt 94 has a corresponding thread, as shown. In this manner, the interface module 18 is secured to the two flanges 82 and 90 by the bolts 94. A through-bolt is not utilized to couple the interface module 18 to either or both the tower sections 12a, 12b. While each of the tower sections 12a and 12b is shown with an integral flange 82, 90, embodiments of the invention are not limited to integral flanges on the tower sections 12a, 12b, or 12c. Flanges may be welded onto sections or added by other means.

With reference to FIG. 4, in the embodiment shown, the interface module 18 is attached at top and bottom surface 64, 66 to the two tower sections 12a and 12b, respectively, by separate fasteners at each interface. In other words, the fasteners 94 do not extend through the interface module 18 to sandwich the module 18 between sections 12a, 12b. For that reason, the interface module 18 carries tensile and compressive loads from the weight of the tower section 12a and the energy generating unit 14 and bending loads from the wind 40. When secured in position, the outer surface 52 and the inside surface 70 of the interface module 18 may generally align with the respective adjacent surfaces of the tower section 12a and 12b. However, embodiments of the invention are not limited to alignment of the surfaces. General alignment between the surfaces may account for a gradually reducing diameter (i.e. tapering) of the tower sections 12a and 12b. While the interface module 18, particularly the annular member 62, appears as a toroid with parallel outer surface 52 and inner surface 70, the interface module 18 is not limited to that configuration. In that regard, the interface module 18 may have a conical configuration in which the outer surface 52 is tapered and so is oriented in parallel relation with the outer surfaces of the adjacent tower sections 12a and 12b. Thus, the interface module 18 may provide exterior surface geometry matching between the end 80 of the tower section 12a and the end 86 of the tower section 12b.

Figure 5:
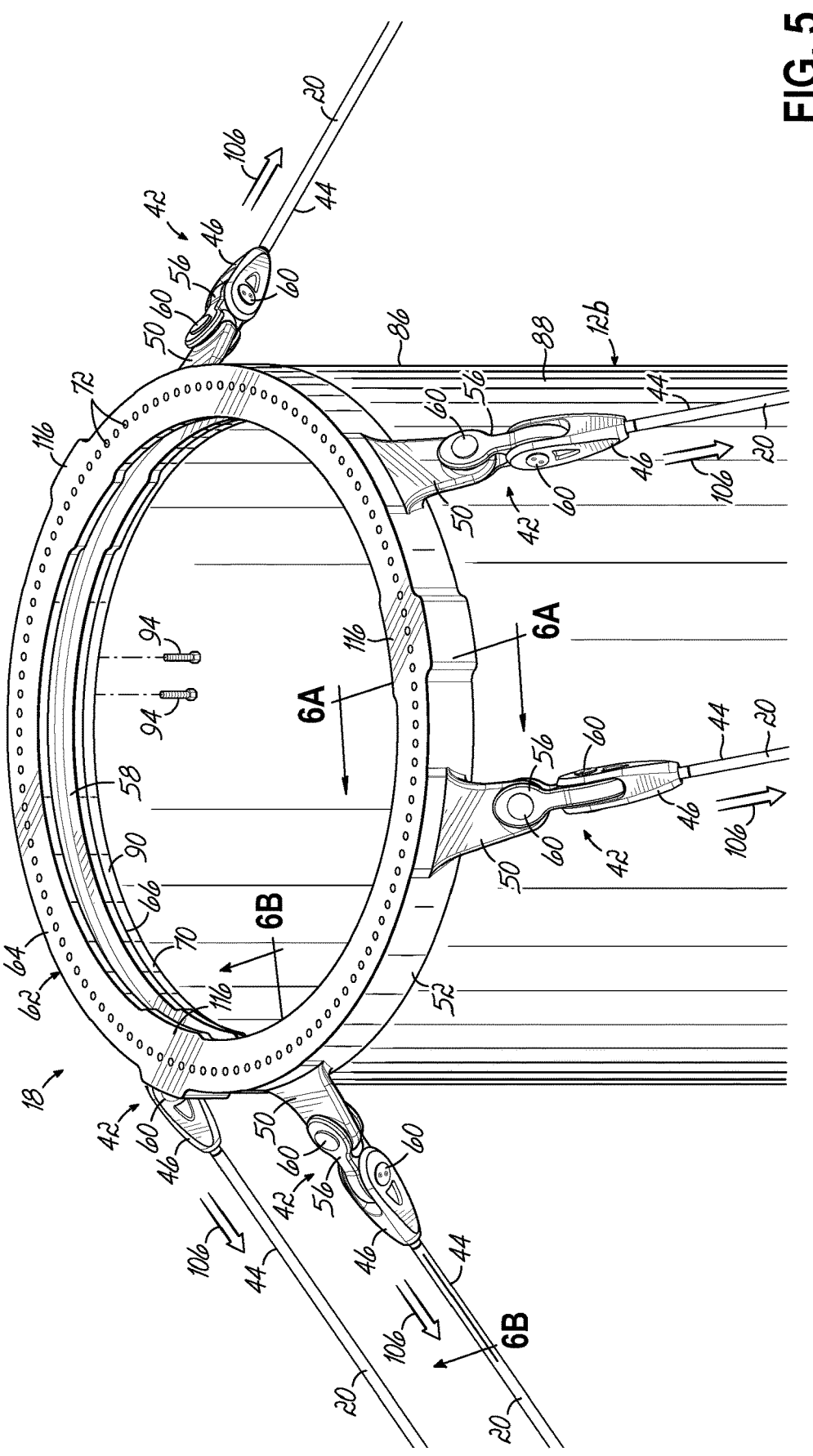
FIG. 5 is a perspective view of a tower section with the interface module of FIGS. 3A and 3B secured thereto according to one embodiment of the invention.

Advantageously, and with reference to FIG. 5, the interface module 18 facilitates installation of the tower 12 by permitting the cables 20 to be pretensioned while connected to the tower section 12b and before the tower section 12a is installed. The cables 20 may be pretensioned by an amount sufficient to increase the stability of tower sections 12b and 12c prior to installation of the tower section 12a. To that end, installation of the tower 12 includes attachment of the tower section 12c to the foundation 16 (FIG. 1). The tower section 12b is hoisted into position and secured to the tower section 12c in accordance with typical installation procedures. The interface module 18 including attached cables 20 is hoisted into position onto the tower section 12b, as is shown in FIG. 5. In that regard, an exemplary method of positioning the interface module 18 on a tower section is described below with reference to FIG. 10. Alternatively, the interface module 18 may be attached to the tower section 12b prior to installation of the tower section 12b on the tower section 12c. The tower section 12b with a pre-installed interface module 18 may then be positioned on the tower section 12c.

With reference to FIGS. 5 and 6A, during construction of the tower 12, the interface module 18 is positioned on the tower section 12b with the bottom surface 66 of the interface module 18 in contact with the flange 90. The flange 90 includes the first through-bore 92 that aligns with the bore 68 in the interface module 18. As shown in FIG. 6A, bores 68 may be threaded 102. The bolts 94 are inserted upwardly and in parallel relation with the axis 76 into the aligned first through-bores 92 and 68 and are screwed into the interface module 18. The threaded bolts 94 secure the interface module 18 only to the tower section 12b.

This arrangement is shown in FIG. 6B. The interface module 18 is secured only to the tower section 12b. Securing the interface module 18 to the tower section 12b occurs before the tower section 12a (shown in phantom) is positioned on the interface module 18. The cables 20, which may be carried by the interface module 18 while the interface module 18 is hoisted into position, as is shown and described below, may then be attached to anchors 22 (FIG. 1), or to another anchor point and at least partly tensioned (indicated by arrows 106 in FIGS. 5 and 6B) before construction of the tower 12 is completed. A tensioning device (not shown) may be utilized to increase tension in one or more cables 20. By way of example only, the cables 20 may be tensioned to at least 70% of the target tension for the wind turbine 10 when fully constructed. As an alternative, the cables 20 may be tensioned to between 30% and 70% of the target tension for the wind turbine when fully constructed.

In any respect, once the cables 20 are pretensioned, the tower sections 12b and 12c are more stable and thus less likely to sway or move in the wind 40 during the remainder of the construction of the wind turbine 10. Advantageously, reducing or eliminating movement of the tower sections 12b and 12c, particularly at the height of the interface module 18, permits additional tower sections, such as tower section 12a, and the energy generating unit 14 to be installed more safely and quickly due to the lack of movement of the interface module 18. In other words, the interface module 18 is not as much of a moving target for attachment of the tower section 12a or the interface module 18 may not move at all even in moderate winds. Once the wind turbine 10 installation is complete, the tension in one or more of the cables 20 may be further increased to their targeted tensile loads.

Referring to FIG. 6B, in one embodiment, the ear 50 is oriented relative to the annular member 62 so that bending moments do not develop in the interface module 18 from the tension in the cable 20. As shown, the ear 50 is pointed in the direction of the cable 20. The direction indicated by arrow 106 may represent a tensile force produced by the cable 20 following complete installation of the wind turbine 10. That tensile force is transferred to the tower 12 at the interface module 18 via each ear 50. As shown, the cable 20 is aligned with a neutral axis 112 of the ear 50. The ear 50 distributes forces from the cable 20 to the annular member 62. To do so without causing a bending moment, the neutral axis 112 intersects a neutral axis 114 of the annular member 62 and intersects a neutral axis 118 of the section 12b (and axis 117 of the section 12a shown in phantom) at intersection 128. With this orientation of the ear 50 relative to the annular member 62, principle components (labeled Fx and Fy) of a tensile force 106 are aligned with each neutral axis 112 and 114 so that bending moments do not develop in the annular member 62 when the cable 20 is tensioned.

Further in that regard and with reference to the joint 42, the cable 20 is oriented to be coincident with the neutral axis 112 as nearly as possible. Because the loading on the wind turbine 10 is dynamic, the tensile force in the cable 20 is also dynamic. Further, the cable 20 may move (e.g., oscillate) during operation of the wind turbine 10. The cardan-type joint 42 prevents any misalignment or movement of the cable 20 relative to the ear 50 during operation of the wind turbine 10 from causing substantial bending stresses in the cable 20 at the end portion 44, such as at the socket 46. In this way, the cable 20 is less likely to be mechanically fatigued.

Figure 6C:
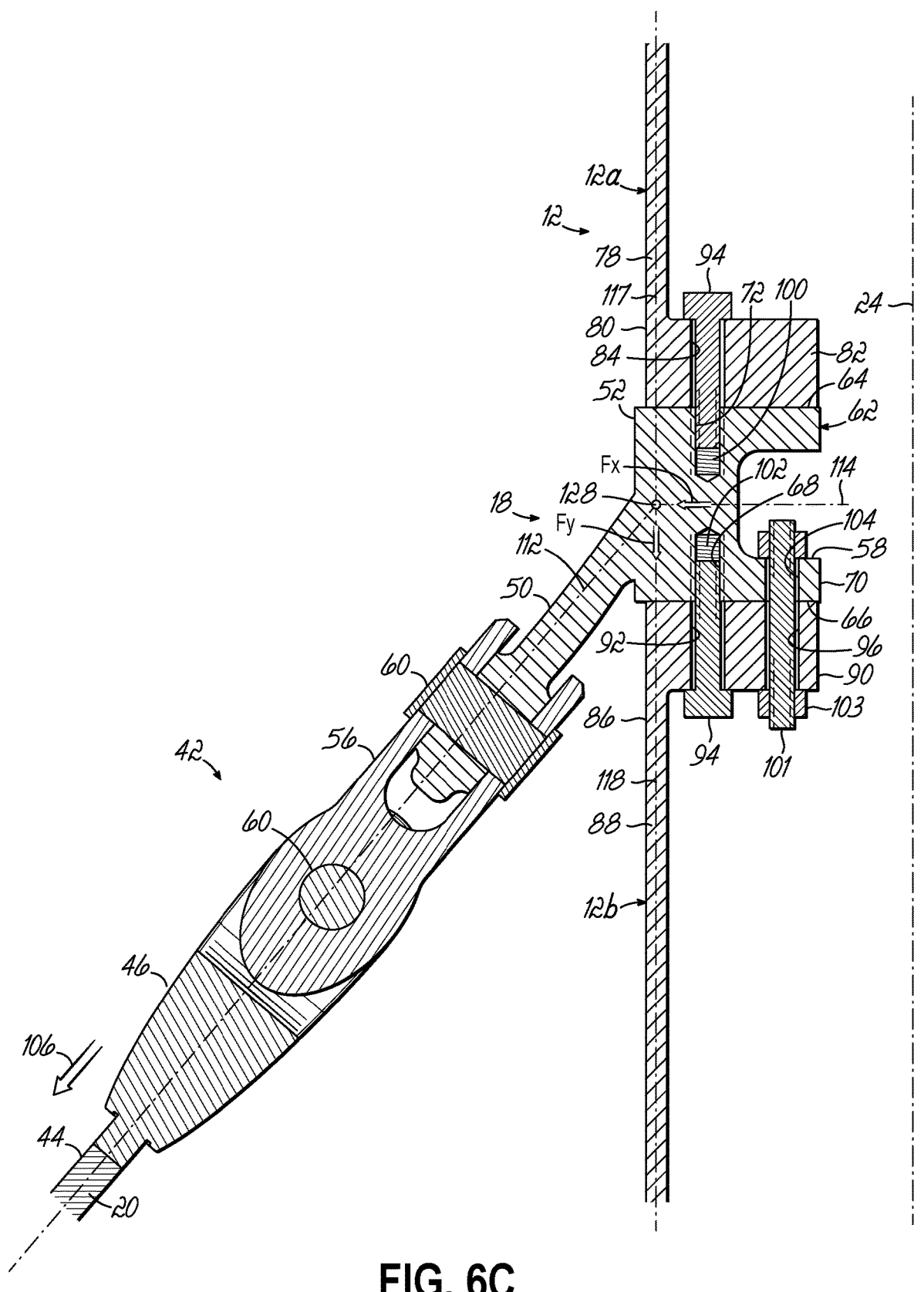
FIG. 6C is a cross-sectional view similar to FIG. 6B depicting one embodiment of the invention.

With reference to FIG. 6C, an alternative tower assembly with the interface module 18 is shown. In the exemplary embodiment, the inwardly directed flange 90 includes two sets of through-bores. The first set is the set of first through-bores 92 located along a relatively larger diameter and positioned nearest the ears 50, and the second set is a set of first through-bores 96 located nearest the tower axis 24. While the two sets of first through-bores 92 and 96 are shown adjacent one another along a cross section, the two sets of first through-bores 92 and 96 need not lay in the same plane. For example, they may be offset from one another and so would not appear adjacent one another in a single cross-section. The interface module 18 includes corresponding bores. These include bores 68, which are configured to align with the first through-bores 92 and are described above with reference to FIGS. 6A and 6B. The interface module 18 further includes third bores 104, which are configured to align with the second set of first through-bores 96 in the inwardly directed flange 90. In the exemplary embodiment, the third bores 104 are through-bores and are shown to open in the channel 58.

Similar to the construction described with reference to FIGS. 6A and 6B, during construction of the wind turbine tower 10, the interface module 18 is secured to the tower section 12b and cables 20 are then tensioned to stabilize the tower section 12b before additional tower sections (e.g., section 12a) are assembled on the interface module 18. The interface module 18 shown in FIG. 6C may be initially secured to the tower section 12b by inserting a bolt 101 through the second set of first through-bores 96 and the third bores 104. A nut 103 may be threaded onto one or both ends of bolts 101. Initially securing the interface module 18 with bolts 101 and nuts 103 precedes attachment of the interface module 18 via the bolts 94. Once the interface module 18 is secured to the lower tower section 12b with the bolts 101 and nuts 103, the cables 20 are tensioned. Hoisting of the cables 20 and tensioning is described above and are achieved in a similar manner. Following tensioning, bolts 94 may be inserted through the first through-bores 92 into the bores 68 and engaged in threads 102. In this way, the interface module 18 may be initially and more quickly secured to the tower section 12b with bolts 101 and nuts 103 followed by additional attachment via bolts 94 at a point in time following tensioning of the cables 20.

In any respect, once the cables 20 are pretensioned, the tower sections 12b and 12c are more stable and thus less likely to sway or move in the wind 40 during the remainder of the construction of the wind turbine 10. Advantageously, reducing or eliminating movement of the tower sections 12b and 12c, particularly at the height of the interface module 18, permits additional tower sections, such as tower section 12a, and the energy generating unit 14 to be installed more safely and quickly due to the lack of movement of the interface module 18. In other words, the interface module 18 is not as much of a moving target for attachment of the tower section 12a or the interface module 18 may not move at all even in moderate winds. Once the wind turbine 10 installation is complete, the tension in one or more of the cables 20 may be further increased to their targeted tensile loads.

Figure 7:
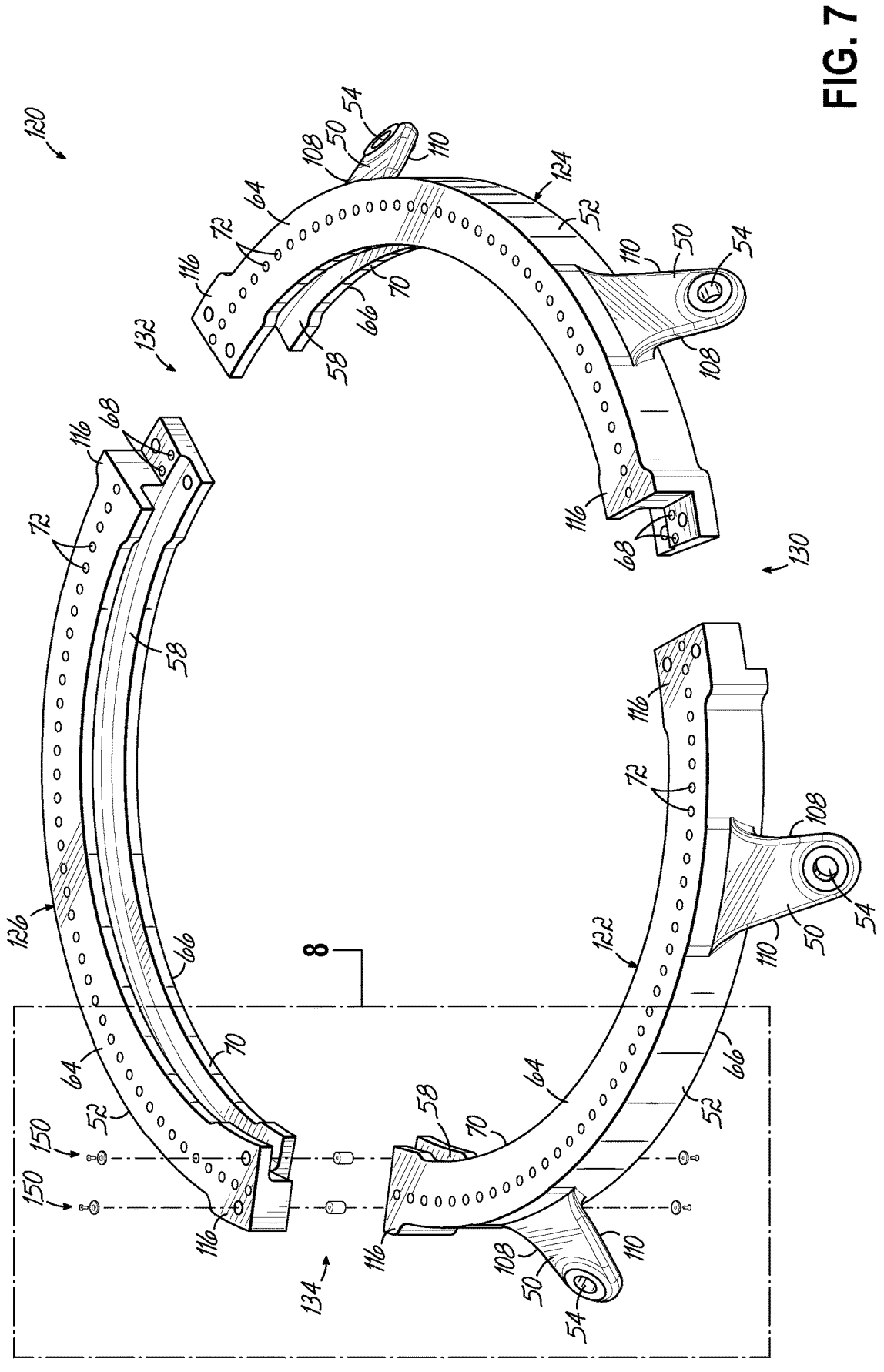
FIG. 7 is an exploded view of one embodiment of an interface module.
Figure 8:
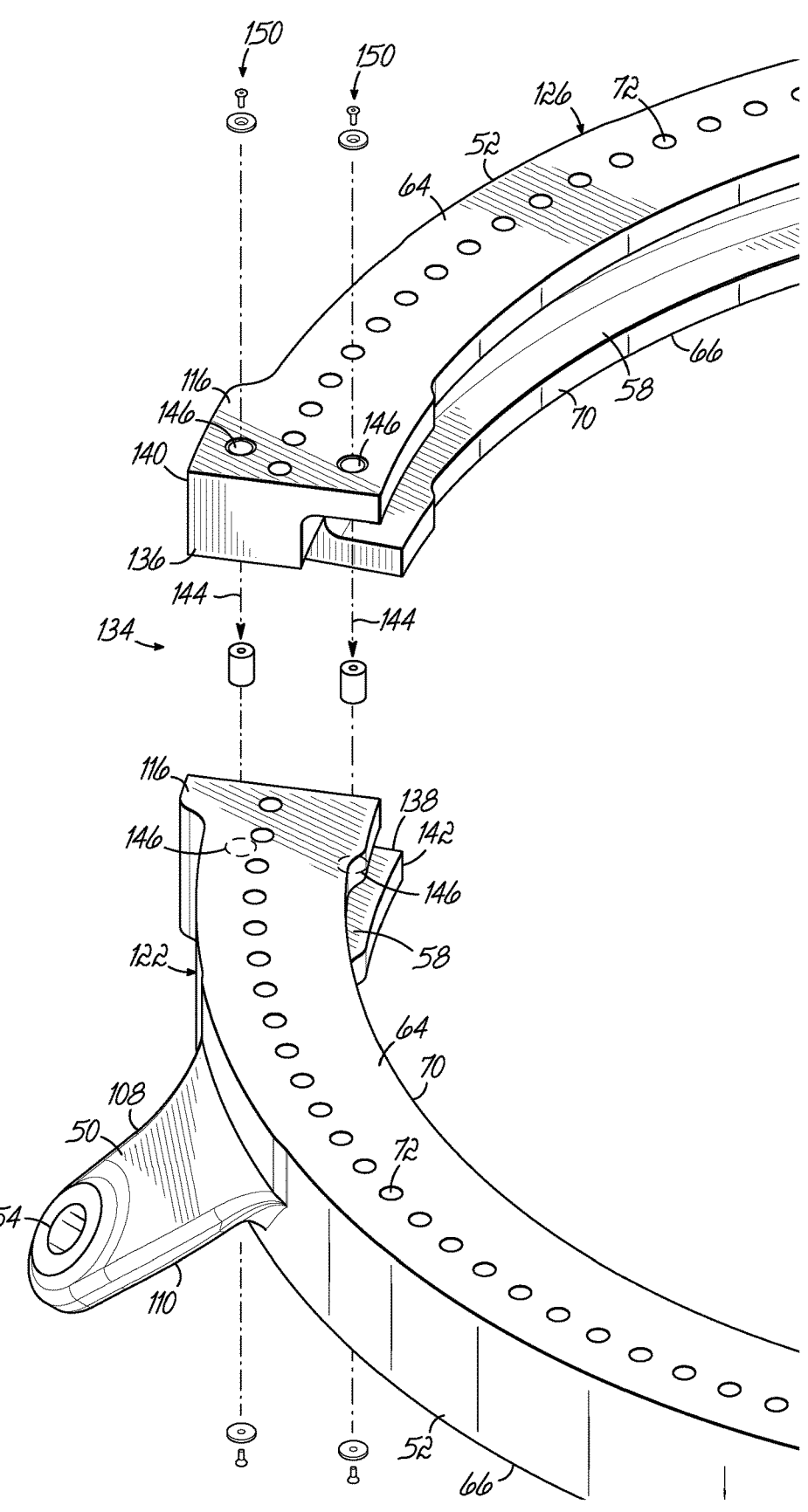
FIG. 8 is an enlarged view of the encircled area 8 in FIG. 7.

Referring now to FIGS. 7 and 8, an alternative interface module is shown. An interface module 120 differs from the interface module 18 of FIGS. 3A and 3B in that the module 120 is segmented. That is, the interface module 120 is not a monolithic metallic structure. However, the interface module 120 may be utilized in the same manner as the interface module 18 described above. In the exemplary embodiment shown, the interface module 120 has three segments 122, 124, and 126 that are assembled together to form a ring. Each segment 122, 124, 126 defines a circular arc. While given different labels, the segments 122, 124, and 126 may be identical. Advantageously, the segments 122, 124, and 126, because they are each smaller than the assembled interface module 120, may be manufactured and shipped individually and so occupy significantly less space for shipping purposes. At the installation site for the wind turbine 10, the segments 122, 124, and 126 are more easily individually handled prior to assembly. In that regard, each segment 122, 124, and 126 are fastened together at joints 130, 132, and 134. An exemplary joint 134 is shown in FIG. 8 and is generally formed in a direction parallel to the axis 76. While not shown, each of the remaining joints 130 and 132 may have a similar or the same configuration.

In the exemplary joint 134 shown in FIG. 8, the joint 134 is formed between an end 136 of the segment 126 and an end 138 of the segment 122. The exemplary joint 134 may be characterized as a lap joint with a partial thickness member 140 of the segment 126 at the end 136 overlapping a partial thickness member 142 of the segment 122 at the end 138. The two partial thickness members 140, 142 together equaling the height of the annular member 62. Although not shown in FIG. 8, an interface between each partial thickness member 140, 142 in the joint 134 is oriented in a plane perpendicular to the vertical tower axis 24 of the tower 12. The partial thickness members 140 and 142 are brought into an overlapping position as indicated by arrows 144. Each of the partial thickness members 140, 142 includes a pair of through bores 146 to receive respective fasteners 150, such as pins, to secure the segment 126 to the segment 122. While fasteners 150 are shown, embodiments of the invention are not limited to the use of fasteners 150. For example, the segments 122, 124, and 126 may be secured together by welding or a combination of fasteners 150 and welding. The joint 134 may be formed at an enlarged area 116 and as such the partial thickness member 140, 142 at ends 136, 138 are generally wider than the non-joint portions of each of the segments 122, 126 which generally form the portion of each segment 122, 124, and 126 between opposing ends. Each joint 130, 132, 134 has the same thickness as the thickness of each of the segments 122, 124, and 126. In this way, the top surface 64 and the bottom surface 66 of the interface module 120 are uniformly planar across each of the segments 122, 124, and 126 when assembled.

Figure 9:
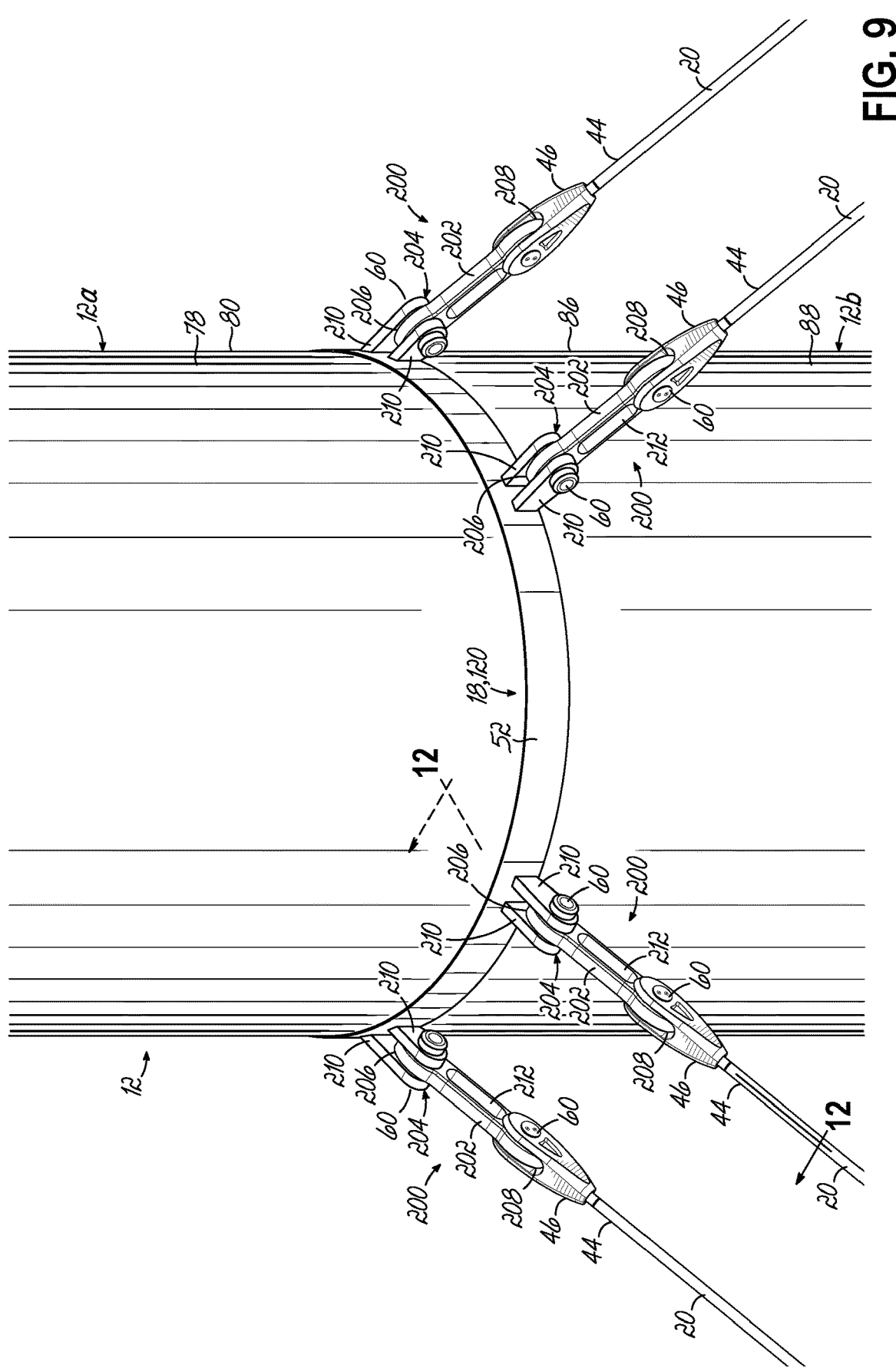
FIG. 9 is an enlarged view of the encircled area 2 in FIG. 1 depicting one embodiment of an interface module.

FIG. 9 illustrates an alternative embodiment of the joint 42 shown in FIG. 2 in which the interface module 18 includes an alternative configuration of the ear 50, shown in FIG. 2. A joint 200 between the cable 20 and the interface module 18 includes a flexible arm 202 that is coupled to an ear 204 extending from the annular member 62 at one end 206 and to the socket 46 at the other end 208. Unlike the ear 50 (FIG. 2), the ear 204 includes a pair of flanges 210 each of which defines a bore. Although not shown in FIG. 9, the flexible arm 202 includes a through-bore near each end 206, 208. The flexible arm 202 is insertable between the pair of flanges 210, and the pin 60 couples the flexible arm 202 to the ear 204 via the bores. At the opposing end 208 of the flexible arm 202, the pin 60 couples the flexible arm 202 to the socket 46.

Unlike the joint 42 shown in FIG. 2, in the joint 200, the axes of rotation defined by pins 60 each lie in a plane that is perpendicular to the vertical tower axis 24 of the tower 12 and are parallel to one another. Rotational movement of the tower 12 about the vertical tower axis 24 is thus generally perpendicular to each of the axes of rotation of the joint 200. The flexible arm 202 is configured to flex in response to at least this motion. To that end, the flexible arm 202 is configured to bend in a vertical plane along its length at loads that torsion the tower 12. The flexible arm 202 is long and slender enough to be able to absorb the installation tolerances and move slightly due to vibrations without being highly stressed. As with the cardan-type joint 42, the joint 200 prevents any misalignment or movement of the cable 20 relative to the ear 204 during operation of the wind turbine 10 from causing fatigue-inducing bending stresses in the cable 20 at the end portion 44. In this way, the cable 20 is less likely to be mechanically fatigued during operation of the wind turbine 10.

Figure 10:
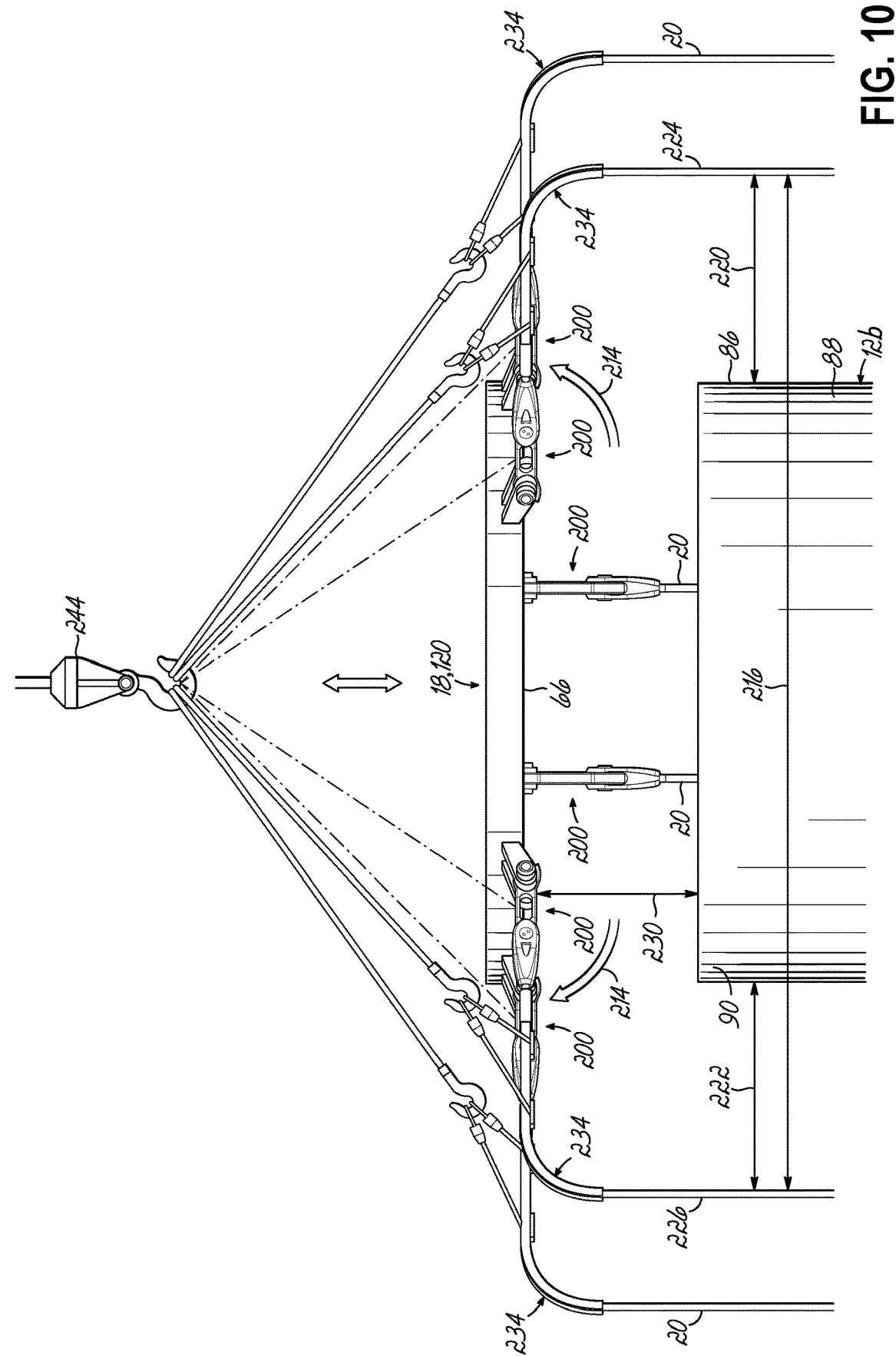
FIG. 10 is an elevation view of installation of an interface module on to a tower section.
Figure 11:
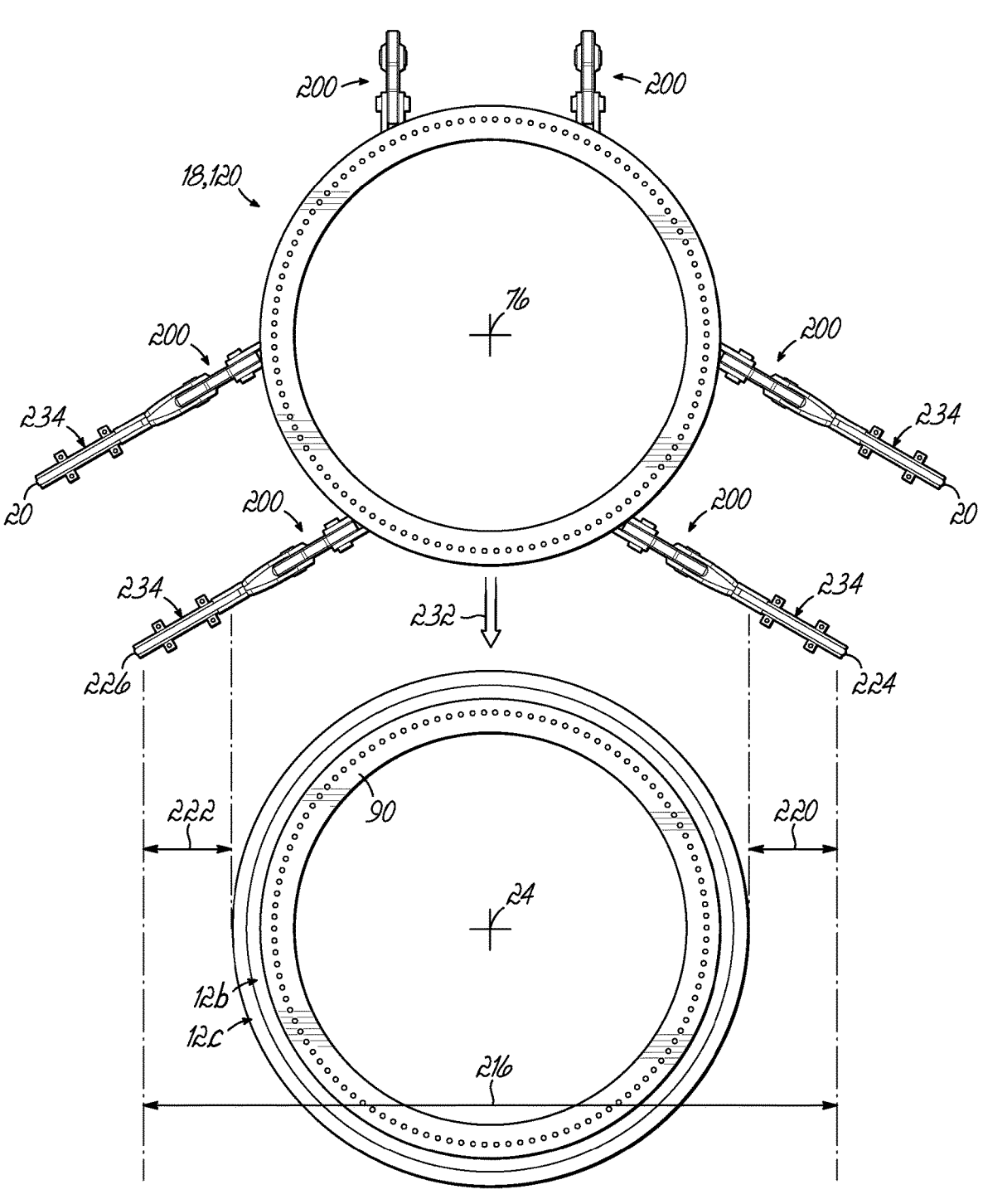
FIG. 11 is a plan view of the installation shown in FIG. 10.

As described above, the interface module 18 is hoisted into position on the tower section 12b. As shown in FIGS. 10 and 11, during installation, the cables 20 are attached to one of the interface modules 18, 120 prior to hoisting it on to the tower sections 12b and 12c. The cables 20, which are longer than the height of the assembled tower sections 12b and 12c, hang from the interface module 18, 120 when the module 18, 120 is attached to a crane hook 244 and lifted into a position proximate the tower section 12b. If the cables 20 are left to hang from the interface module 18, their position can interfere with installation of the interface module 18, 120. To prevent interference, the cables 20 may be held in a position outwardly from the interface modules 18, 120 by one or both of two exemplary structures, described below.

Figure 10A:
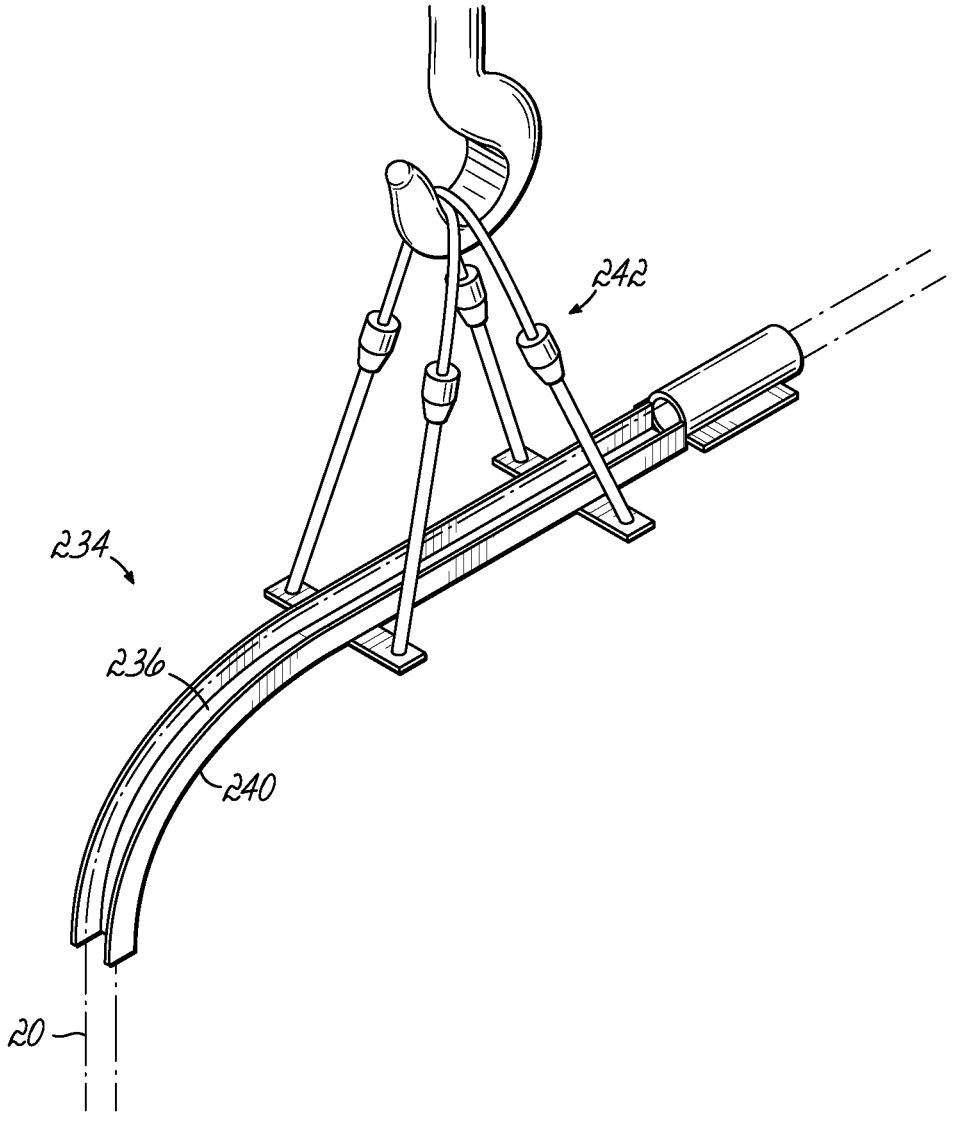
FIG. 10A is an enlarged view of a stress relief mechanism utilized during installation of an interface module according to one embodiment.

One structure includes a strain-relief fixture 234. As shown in FIGS. 10 and 10A, the strain-relief fixture 234 may include an open channel 236 that defines a predetermined bend radius 240. The cable 20 lays in the channel 236, and the channel 236 prevents the cable 20 from bending by more than the predetermined bend radius 240 as the interface module 18, 120 is hoisted into position atop the section 12b. The strain-relief fixture 234 may be supported by linkage 242 that is coupled to the crane hook 244. The strain-relief fixture 234 is utilized to prevent the cable 20 from bending sharply while the interface module 18, 120 is hoisted on to the tower sections 12b, 12c by the crane hook 244. In one embodiment, of the six cables 20, four are lifted about the joint 200 (shown by arrows 214) via the strain-relief fixture 234. In this way, the strain-relief fixture 234 moves the cable 20 upwardly and away from one another to thereby create an opening through which the tower sections 12b and 12c may pass as the interface module 18, 120 is moved into position over the tower section 12b. Moving the cables 20 out of the way is also shown in FIG. 11.

In FIG. 11, selected cables 20 are moved aside from a position in which they would otherwise hang from their respective joints 200 under the influence of gravity. Moving the cables 20 from this normal hanging position widens an opening 216 to a distance that is greater than the largest diameter of the tower 12. The opening 216 may provide a clearance 220 and 222 between sides of the tower section 12b, 12c and the cables 20. For example, in the exemplary embodiment shown in FIGS. 10 and 11, the tower sections 12b and 12c are in position. When hoisting the interface module 18, 120 onto the tower section 12b, the opening 216 is at least as large as the largest diameter of the tower sections 12b and 12c. This is shown best in FIG. 11 in which the opening 216 between cables 224 and 226 is larger than the diameter of the tower sections 12b and 12c and provides clearance 220 and 222 to each side of the tower section 12b, 12c.

With the cables 20 in a position spaced apart from the tower sections 12b and 12c, the interface module 18, 120 need only clear the end 86 of the tower section 12b by a minimal amount 230 (FIG. 10). By way of example only, the minimal amount 230 may be from a few centimeters to half a meter. The cables 20 positioned opposite from the direction of movement (indicated by arrows 232 in FIG. 12) of the interface module 18, 120 toward the tower sections 12a, 12b may not be moved prior to installation. Attaching the cables 20 to the interface module 18, 120 prior to hoisting and separating selected cables 20 to widen an opening for the tower section 12b is advantageous. Not only does this procedure permit the installation of the interface module 18, 120 with cables 20 attached as a unit on to the tower section 12b, it also improves safety and reduces time to complete installation. Once the interface module 18, 120 is in position on the tower section 12b, the crane hook 244 may be moved downwardly to allow the cables 20 drop toward the earth and to eventually hang directly by the respective joint 200. The controlled, gradual drop of the cables 20 may prevent them from being strained or otherwise damaged during installation.

Figure 12:
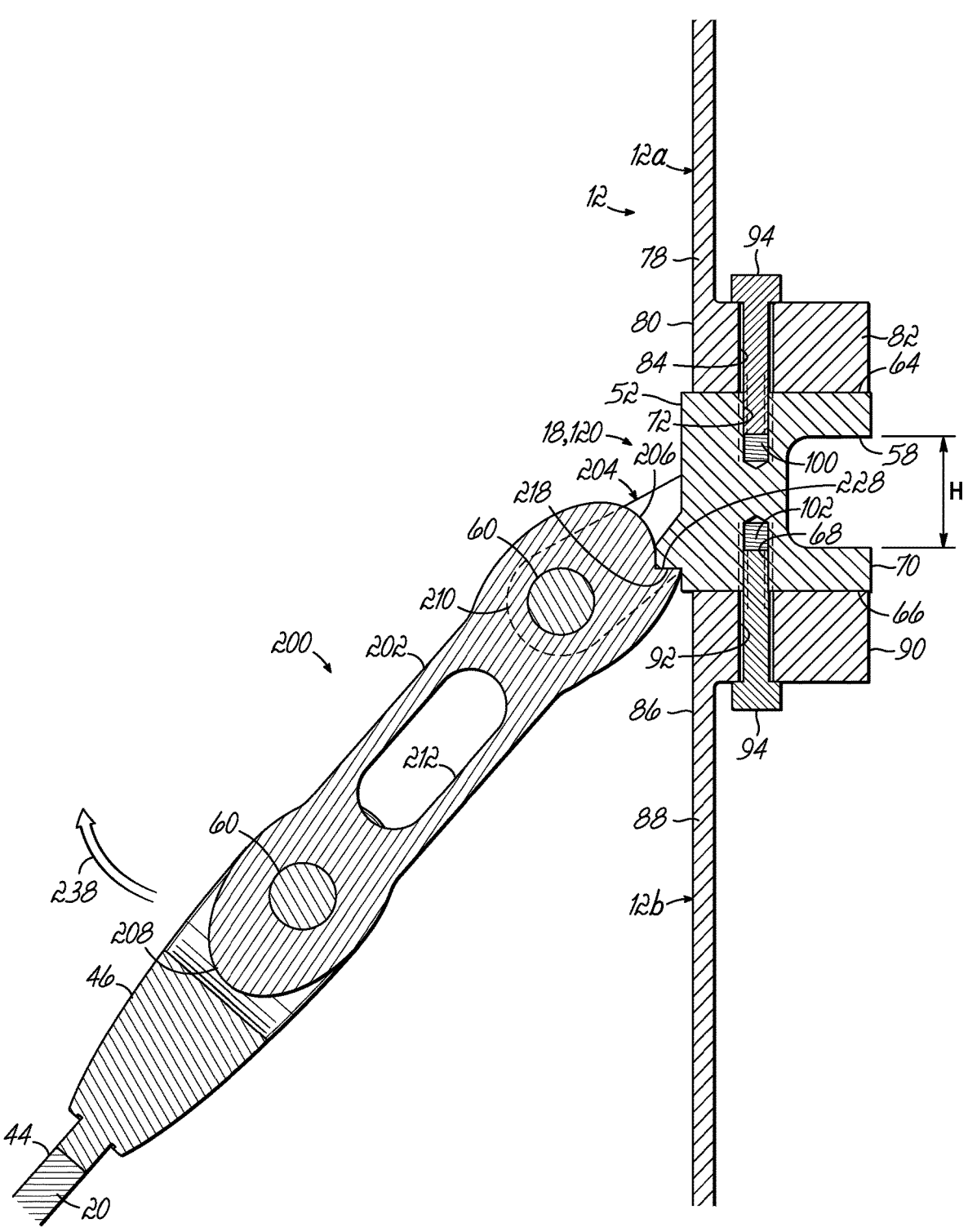
FIG. 12 is a cross sectional view of the interface module shown in FIG. 9.

Another mechanism by which the cables 20 may be held outwardly and so are prevented from interfering with installation of the interface module 18, 120 onto the tower 12 is shown in FIG. 12. In one embodiment of the interface module 18, 120, a lock or stop 218 extends from the outer surface 52 between flanges 210. The flexible arm 202 includes a stop 228 that is configured to contact the stop 218 on the interface module 18, 120 as the flexible arm 202 rotates about the pin 60. The placement of the stops 218, 228 permits rotation of the flexible arm 202 about the pin 60 in one direction (indicated by arrow 238) but limits rotation of the flexible arm 202 in the opposing direction. The rotational limitation provided by the stops 218, 228 are designed to maintain each of the cables 20 in an orientation that holds the cables 20 further radially outward from the interface module 18, 120 and so permits installation of the interface module 18, 120 without interference from the cables 20. As can be appreciated, if the interface module 18, 120 is lifted with the cables 20 attached, the cable 20 would hang from each ear 204 under gravity. Although not shown, the cable 20 would essentially hang straight down from the pin 60 at the end 206 of the arm 202. In this position, the spaces between hanging cables 20 would be insufficient for the tower section 12b to pass during movement of the interface module 18, 120 over the tower 12 shown in FIG. 11. However, in the presence of the stops 218, 228, the cables 20 would hang from the end 208 of the flexible arm 202.

To that end, during installation of the interface module 18, 120, the stops 218, 228 prevent the cable 20 from hanging straight down from the ear 204. The cable 20 is held outwardly by at least the length of the ear 204 and the flexible arm 202. A hanging cable 20 would then clear the tower 12b during installation by a distance related to the length of the flexible arm 202. This distance may be sufficient to maintain the opening 216 through which the tower sections 12b, 12c may pass during installation of the interface module 18, 120 toward the tower sections 12b, 12c according to arrows 232 in FIG. 11. One or both the strain-relief fixture 234 and the stops 218, 228 may be utilized during the installation of the interface module 18, 120.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

What is claimed is:

1. A wind turbine supported by a plurality of cables, the wind turbine comprising:

a tower comprising:

at least two tower sections, including an upper section having a lower end and a lower section having an upper end, the lower section at its upper end including an inwardly directed flange having a plurality of first through-bores, the upper section at its lower end including an inwardly directed flange having a plurality of second through-bores; and an interface module secured to the upper end of the lower section and including an annular member from which one or more ears extend outwardly, each ear being configured to be coupled to one of the plurality of cables, the annular member including a plurality of first bores that align with the plurality of first through-bores in the inwardly directed flange of the lower section, each of the plurality of first bores has a screw thread, the annular member includes a plurality of second bores that align with the plurality of second through-bores in the inwardly directed flange of the upper section, each of the plurality of second bores having a screw thread; and an energy generating unit being disposed on the tower and configured to produce electrical energy from wind;

wherein the annular member includes an outside surface, a top surface, a bottom surface, and an inner surface, the inner surface including a channel, wherein the plurality of first bores and the plurality of second bores extend only partway into the annular member and terminate at a location spaced between the channel and the outer surface.

2. The wind turbine of claim 1, wherein the lower section includes a wall from which the inwardly directed flange extends, each ear extends outwardly and downwardly from the annular member so that a neutral axis of the ear intersects a neutral axis of the annular member at a neutral axis of the wall.

3. The wind turbine of claim 1, further including a plurality of threaded fasteners, individual ones of the plurality of fasteners extending through individual ones of the plurality of first through-bores and engaging the screw thread of each of the plurality of first bores to secure the interface module to the lower section.

4. The wind turbine of claim 1, wherein the annular member including a plurality of third bores, the third bores are through-bores that open in the channel, wherein the inwardly directed flange having a second set of first through-bores, wherein the third bores align with the second set of first through-bores in the inwardly directed flange, wherein the channel is configured to receive a nut, and wherein the nut is threadable onto a bolt inserted through the third bore.

5. The wind turbine of claim 1, wherein each cable is coupled to a respective ear at a cardan joint.

6. The wind turbine of claim 1, wherein each ear includes a pair of spaced-apart flanges.

7. The wind turbine of claim 1, wherein each cable is coupled to a respective ear at a joint, and the joint includes two rotational axes that are each oriented in a respective plane parallel to one another while being perpendicular to a vertical tower axis.

8. The wind turbine of claim 7, wherein the two rotational axes are spaced apart by a flexible arm.

9. The wind turbine of claim 8, wherein the annular member further includes a stop and the flexible arm includes a stop that is configured to contact the stop on the annular member to provide a limit to rotational movement of the flexible arm when the flexible arm rotates under the influence of gravity.

10. The wind turbine of claim 1, wherein the annular member forms a non-segmented, continuous ring.

11. The wind turbine of claim 1, wherein the annular member comprises a collection of separate segments that are configured to be assembled together, each segment defining a circular arc and being coupled to other segments at a joint at each end of the circular arc.

12. The wind turbine of claim 11, wherein the annular member consists of three segments, each segment including at least two of the one or more ears.

13. A wind turbine supported by a plurality of cables, the wind turbine comprising:

a tower comprising:

at least two tower sections, including an upper section having a lower end and a lower section having an upper end, the lower section at its upper end including an inwardly directed flange, the inwardly directed flange having a plurality of first through-bores and a wall from which the inwardly directed flange extends; and an interface module secured to the upper end of the lower section and including an annular member from which one or more ears extend outwardly and downwardly so that a neutral axis of the ear intersects a neutral axis of the annular member at a neutral axis of the wall, each ear being configured to be coupled to one of the plurality of cables, the annular member including a plurality of first bores that align with the plurality of first through-bores in the inwardly directed flange, and an energy generating unit being disposed on the tower and configured to produce electrical energy from wind;

wherein the annular member includes an outside surface, a top surface, a bottom surface, and an inner surface, the inner surface including a channel, wherein the plurality of first bores and the plurality of second bores extend only partway into the annular member and terminate at a location spaced between the channel and the outer surface.

14. A method of installing a wind turbine including an energy generating unit and a wind turbine tower to be coupled to a plurality of cables, the method comprising:

installing at least one lower tower section on a foundation, an uppermost one of the at least one lower tower section having an upper end and including an inwardly directed flange at its upper end, the inwardly directed flange having a plurality of first through-bores;

installing an interface module on the upper end of the at least one lower tower section, the interface module including an annular member and a plurality of ears extending outwardly, each ear for receiving one of the plurality of cables, the annular member including a plurality of first bores, wherein installing includes aligning the plurality of first bores with the plurality of first through-bores in the inwardly directed flange, wherein the annular member includes an outside surface, a top surface, a bottom surface, and an inner surface, the inner surface including a channel, wherein the plurality of first bores extend only partway into the annular member and terminate at a location spaced between the channel and the outer surface;

inserting a plurality of threaded fasteners through individual ones of the plurality of first through-bores and into individual ones of the plurality of first bores to secure the interface module to the uppermost one of the at least one lower tower section;

after securing the interface module, tensioning each cable between one of the plurality of ears and an anchor and after tensioning, installing the energy generating unit on the wind turbine tower, wherein inserting the plurality of fasteners includes securing the interface module to the upper most one of the at least one lower tower section and prior to installing the energy generating unit, the method further comprising:

installing an upper tower section on the interface module.

15. The method of claim 14, wherein the plurality of first bores include a screw thread and wherein inserting the plurality of threaded fasteners includes threading at least one threaded fastener to engage the screw thread of one first bore.

16. The method of claim 14, wherein the upper tower section includes an inwardly directed flange at one end thereof, the inwardly directed flange including a plurality of second through-bores, and the annular member includes a plurality of second bores, each of the plurality of second bores having a screw thread, and wherein installing the upper tower section includes aligning the second through-bores with the second bores and inserting a plurality of threaded fasteners through the second through-bores and into the second bores to engage the screw thread of the second bore to secure the upper tower section to the interface module.

17. The method of claim 14, wherein the plurality of first bores in the annular member are blind bores and wherein inserting the plurality of threaded fasteners includes inserting the threaded fasteners upwardly through the first through-bores and into the blind bores.

18. The method of claim 14, wherein prior to installing the interface module, the method further comprises:

attaching one or more of the plurality of cables to one or more of the plurality of ears.

19. The method of claim 18, wherein during installing the interface module, the method includes separating the attached cables to create an opening sized to allow the upper most of the at least one tower section to pass through the opening.

20. The method of claim 16, wherein the plurality of second bores extend only partway into the annular member and terminate at a location spaced between the channel and the outer surface.

* * * * *